(12) United States Patent
Bogineni et al.

(10) Patent No.: US 7,984,130 B2
(45) Date of Patent: Jul. 19, 2011

(54) MULTIMEDIA NEXT GENERATION NETWORK ARCHITECTURE FOR IP SERVICES DELIVERY BASED ON NETWORK AND USER POLICY

(75) Inventors: Kalyani Bogineni, Hillsborough, NJ (US); Gerard J. Flynn, Washington, NJ (US); William H. Stone, Jr., Doylestown, PA (US); Edward A. Salas, Tewksbury, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 1179 days.

(21) Appl. No.: 11/485,991

(22) Filed: Jul. 14, 2006

(65) Prior Publication Data

US 2008/0013533 A1  Jan. 17, 2008

(51) Int. Cl.
*G06F 15/173* (2006.01)
(52) U.S. Cl. ....................................................... 709/223
(58) Field of Classification Search .................. 709/223; 370/356, 252
See application file for complete search history.

(56) References Cited

U.S. PATENT DOCUMENTS

| | | | | |
|---|---|---|---|---|
| 5,195,086 A * | 3/1993 | Baumgartner et al. | ........ | 370/264 |
| 5,461,669 A * | 10/1995 | Vilain | ............................ | 379/350 |
| 6,192,250 B1 * | 2/2001 | Buskens et al. | ............... | 455/463 |
| 6,490,451 B1 * | 12/2002 | Denman et al. | ............... | 455/436 |
| 6,690,679 B1 * | 2/2004 | Turunen et al. | ................ | 370/352 |
| 6,708,031 B2 * | 3/2004 | Purnadi et al. | ................ | 455/436 |
| 6,757,745 B1 * | 6/2004 | Hamann et al. | ............... | 709/250 |
| 6,993,332 B2 * | 1/2006 | Pedersen et al. | ............... | 455/436 |
| 7,236,794 B2 * | 6/2007 | Shin | .............................. | 455/453 |
| 7,436,779 B1 * | 10/2008 | Mangal et al. | ................. | 370/252 |
| 7,505,451 B2 * | 3/2009 | Hashizume et al. | .......... | 370/352 |
| 7,620,384 B2 * | 11/2009 | Cai et al. | ......................... | 455/406 |
| 2002/0075875 A1 * | 6/2002 | Dravida et al. | .......... | 370/395.21 |
| 2002/0177435 A1 * | 11/2002 | Jenkins et al. | ................. | 455/412 |
| 2003/0126466 A1 * | 7/2003 | Park et al. | ...................... | 713/201 |
| 2004/0073686 A1 * | 4/2004 | Hurta | ............................. | 709/229 |
| 2004/0249884 A1 * | 12/2004 | Caspi et al. | .................... | 709/204 |
| 2005/0213513 A1 * | 9/2005 | Ngo et al. | ....................... | 370/254 |
| 2006/0056394 A1 * | 3/2006 | Kuure et al. | ................... | 370/352 |
| 2007/0073899 A1 * | 3/2007 | Judge et al. | .................... | 709/246 |
| 2007/0100981 A1 * | 5/2007 | Adamczyk et al. | ........... | 709/223 |
| 2007/0258399 A1 * | 11/2007 | Chen | .............................. | 370/328 |
| 2008/0298353 A1 * | 12/2008 | Zhu et al. | ....................... | 370/356 |

* cited by examiner

*Primary Examiner* — Firmin Backer
*Assistant Examiner* — Michael A Chambers
(74) *Attorney, Agent, or Firm* — McDermott Will & Emery LLP

(57) ABSTRACT

The exemplary Multimedia Next Generation Network architecture disclosed herein covers the entire next generation system, e.g. for wireless communication services, including application, signaling and bearer functionalities. The architecture addresses unification of subscriber databases for both SIP services and non-SIP services in a Services Data Management Center (SDMC). A Security Center (SC) provides a central repository for all security related databases and functions. An Application Control Point (ACP) provides a single point of services control for all active SIP services for all subscribers via state information and services interaction management. Policy decisions are made at the packet layer, for example in an Advanced Bearer Control Point (ABCP) clustered with other functions to form a Bearer Services Control Point (BSCP). Policy enforcement is implemented at various nodes at the network or packet layer (L3) and above, e.g. including the BSCP and ACP.

18 Claims, 11 Drawing Sheets

Functional Reference Architecture

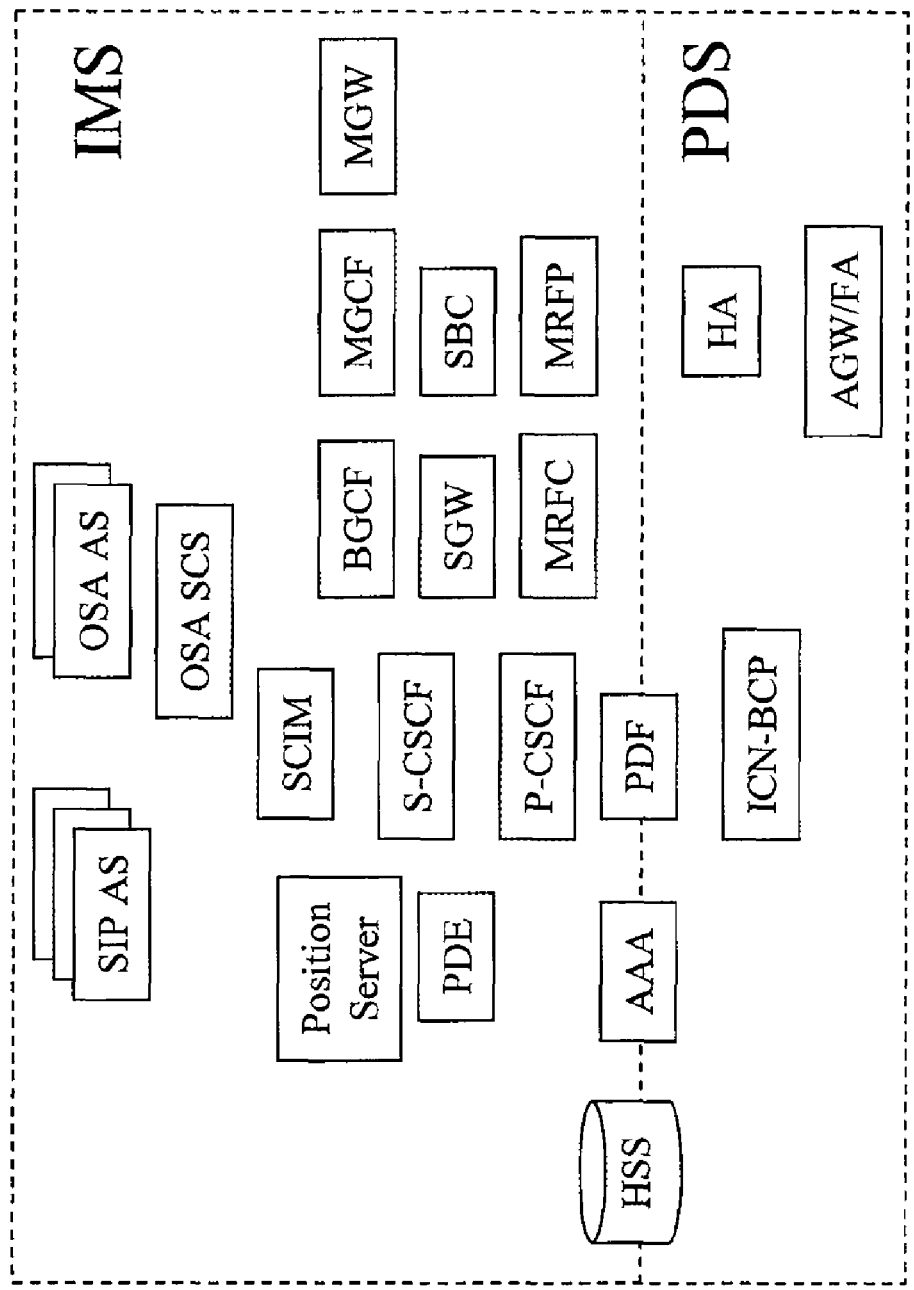
FIG 1: Prior Art 3GPP2 MMD Functional Architecture

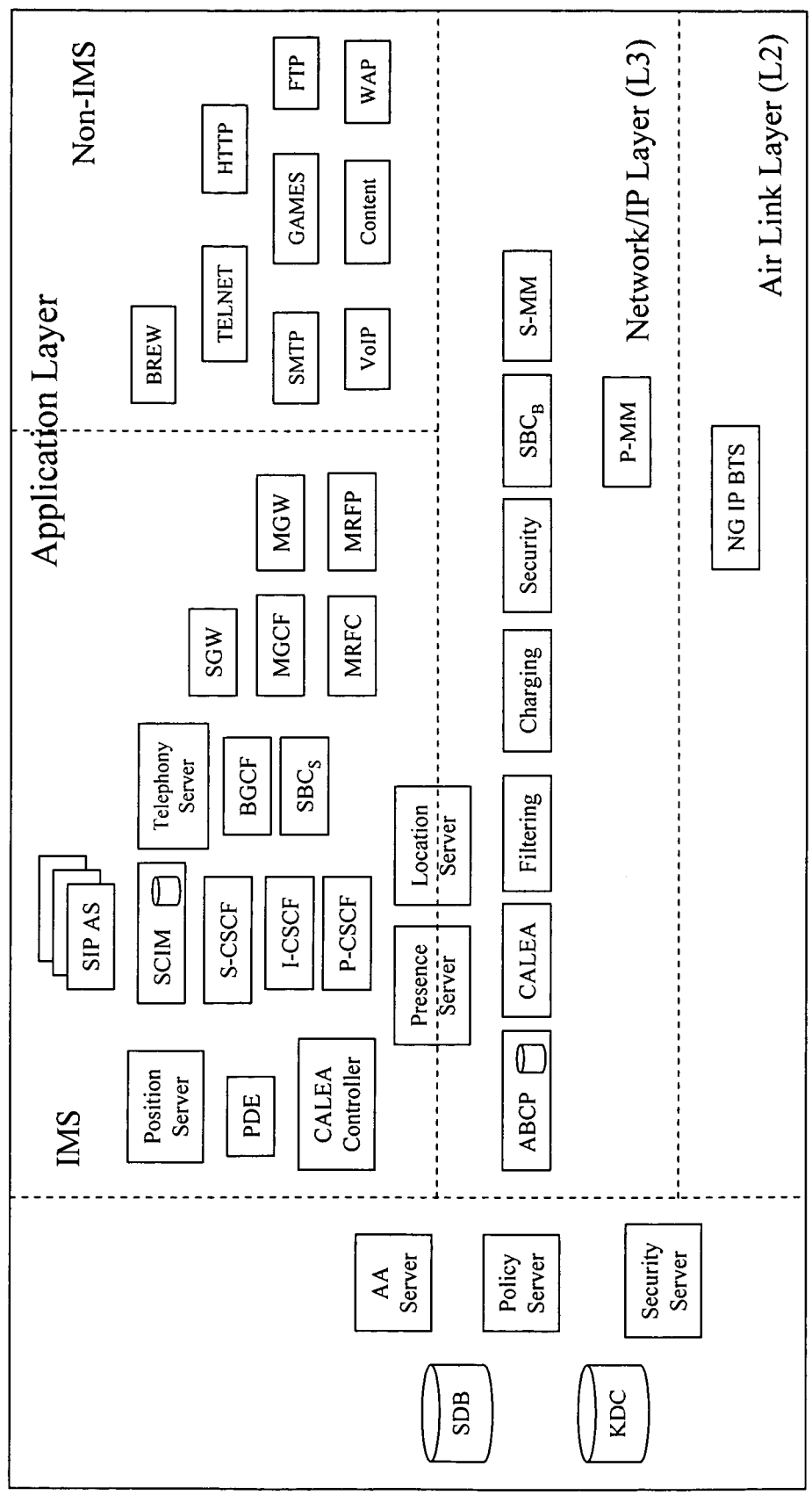
FIG. 2: Expanded Functional Architecture

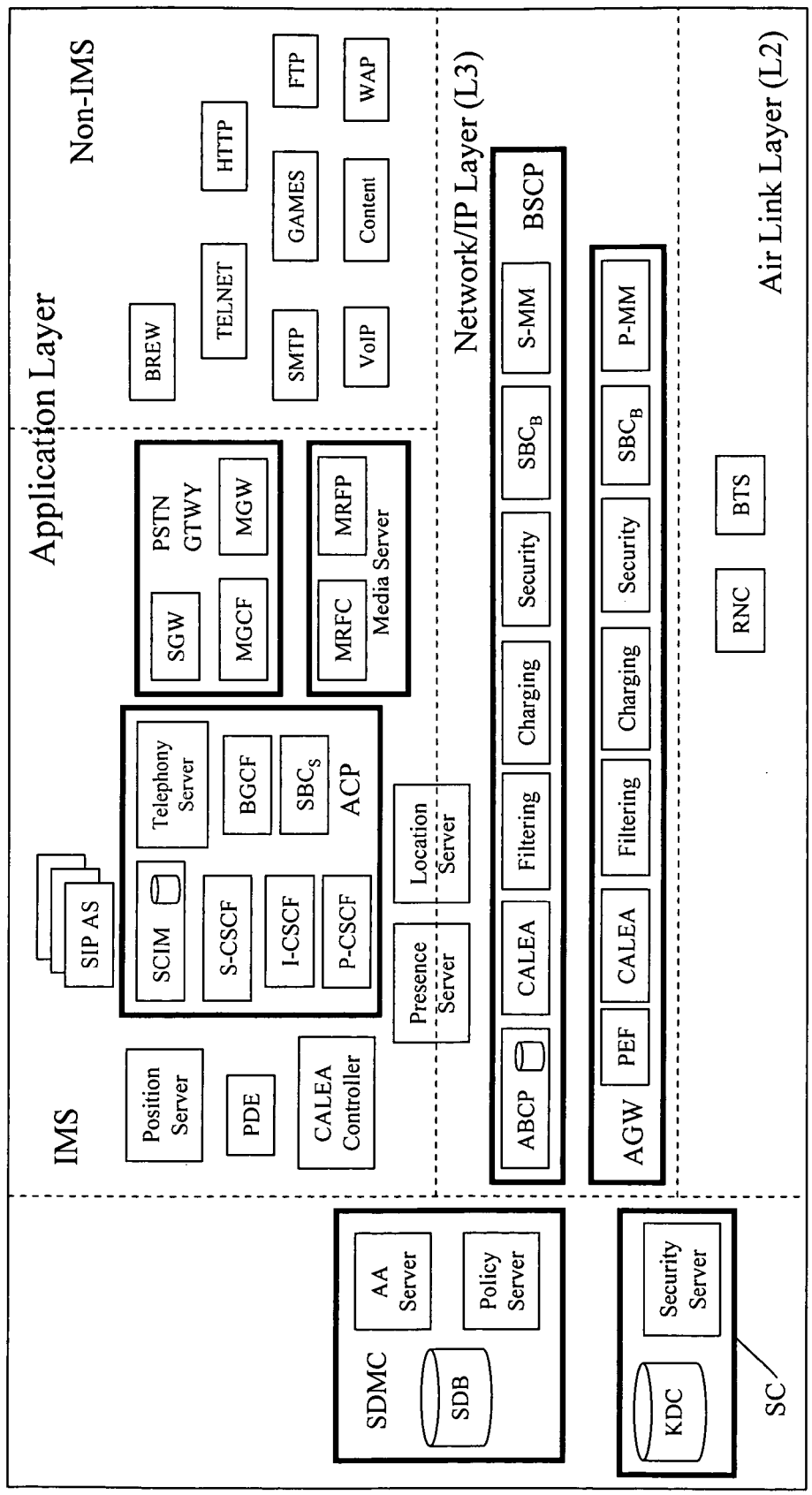
FIG. 3A: Expanded Architecture with Functional Clustering

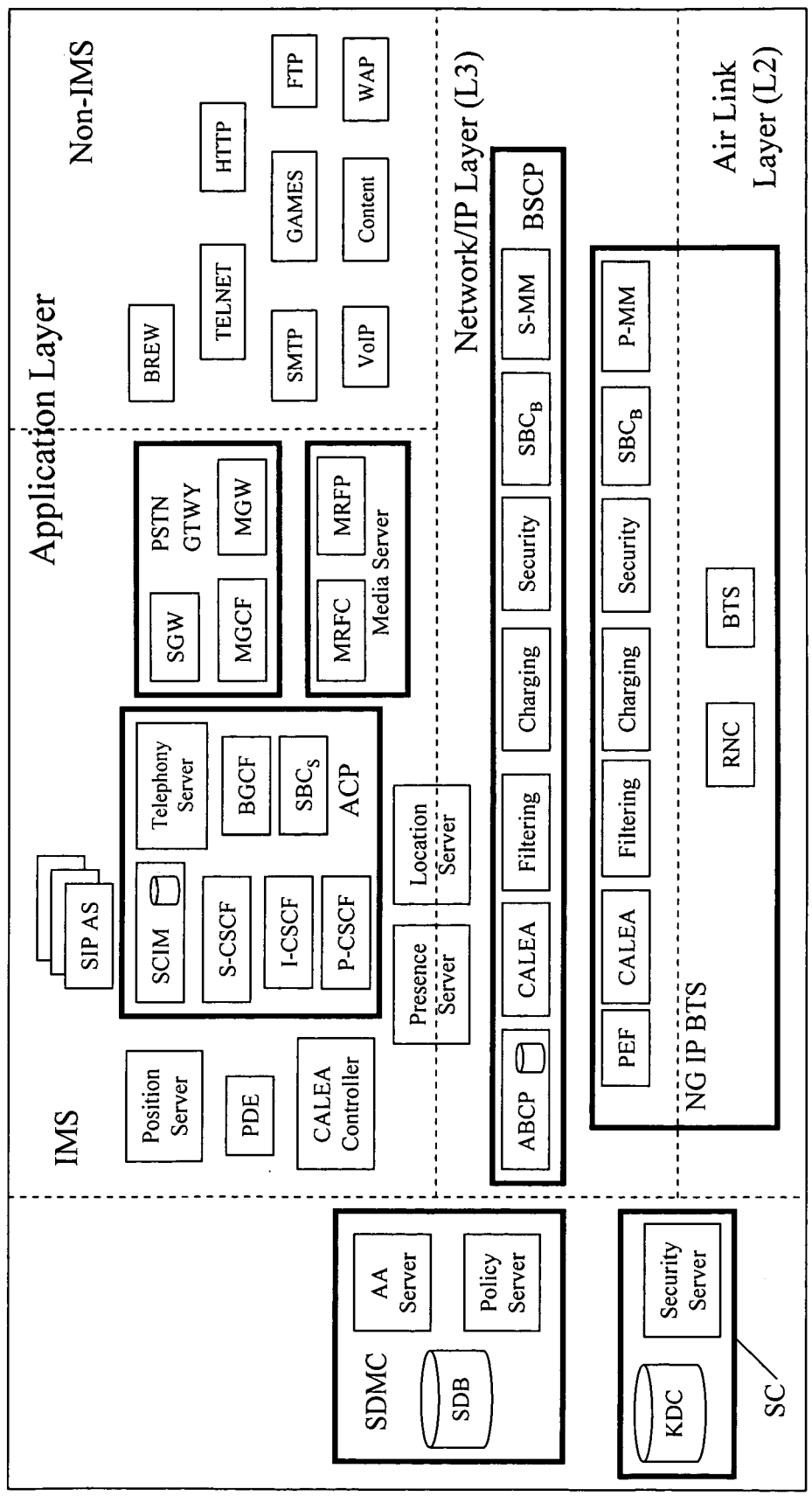
FIG. 3B: Expanded Architecture with Functional Clustering

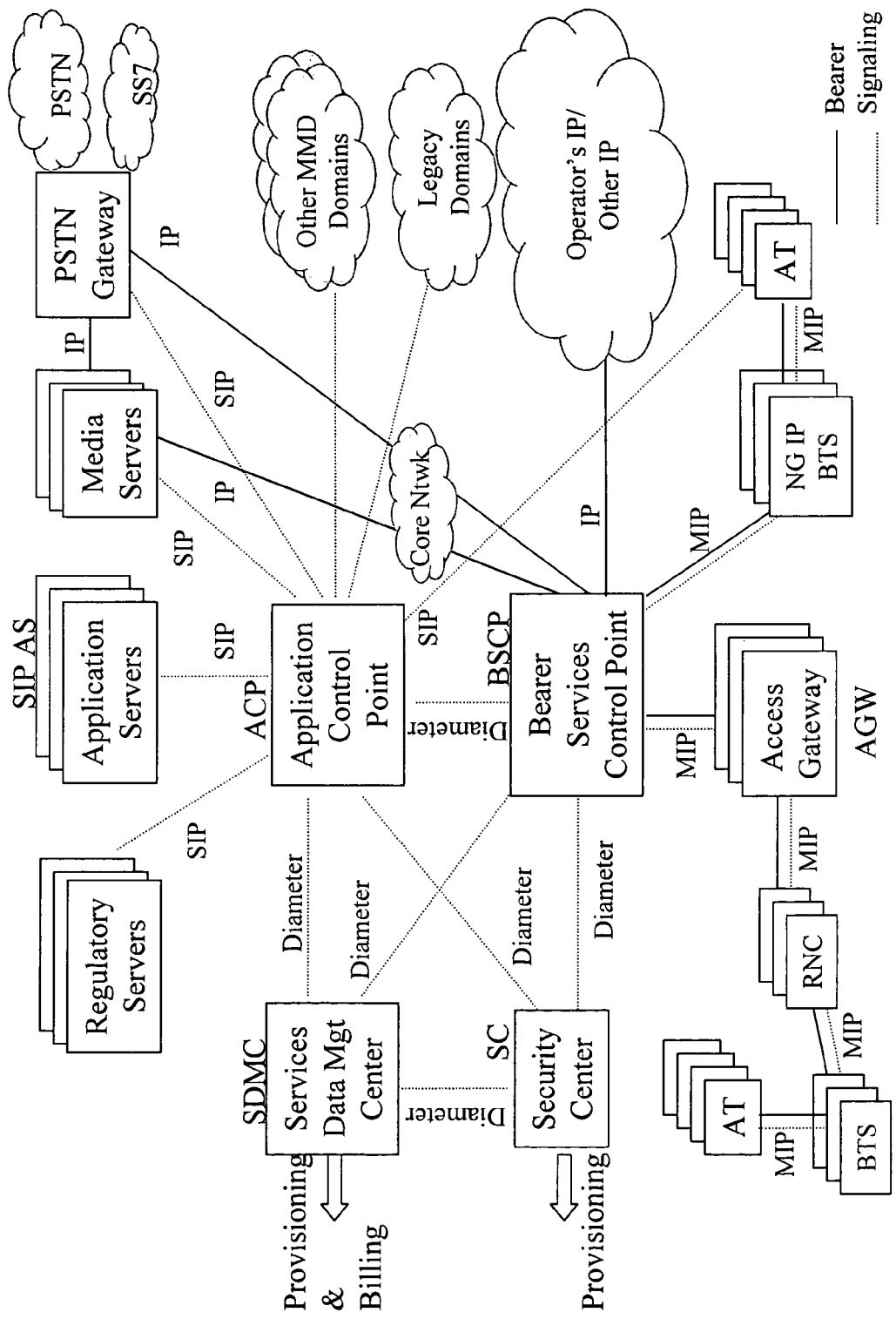
FIG. 4: Functional Reference Architecture

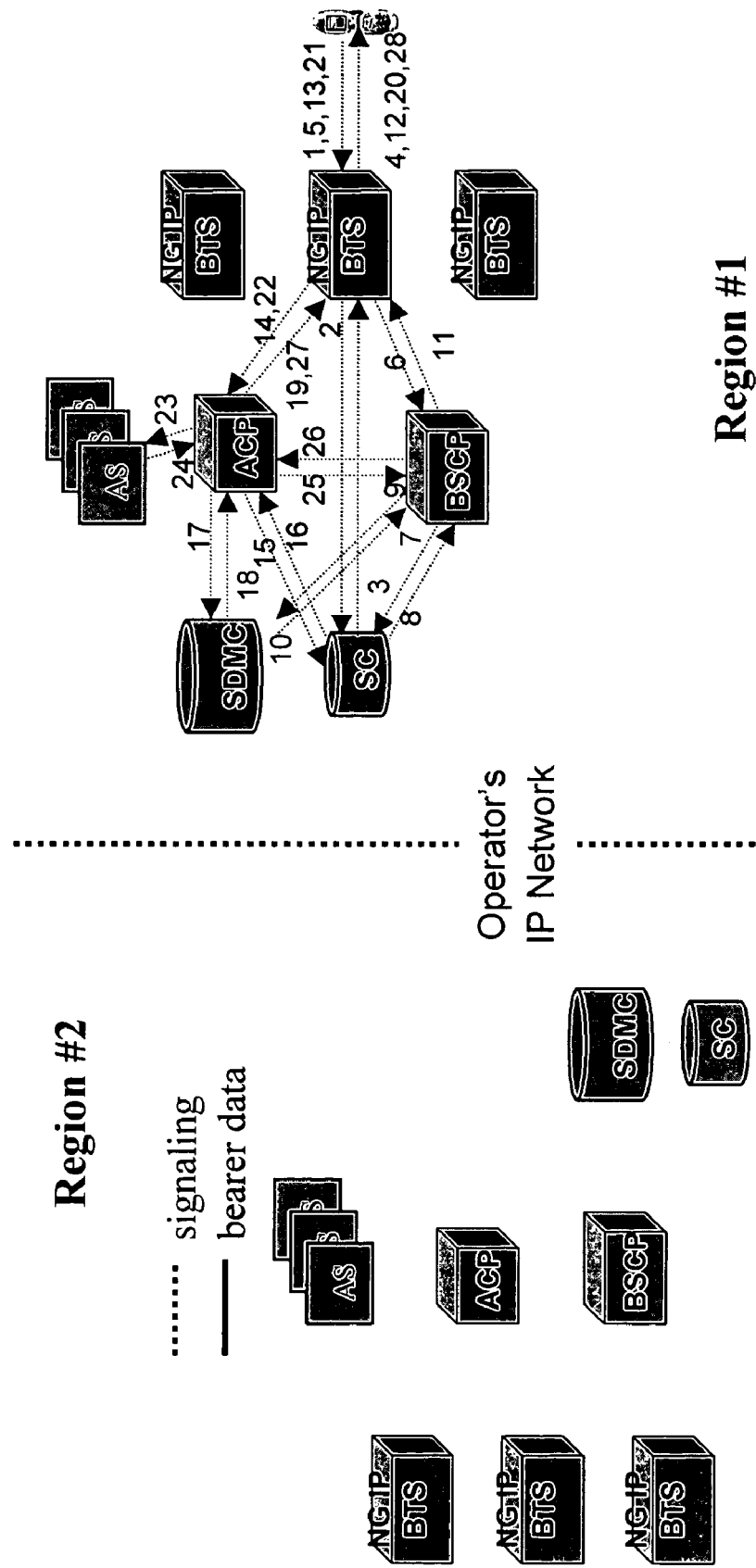
FIG. 5: Subscriber Registration in Home Area

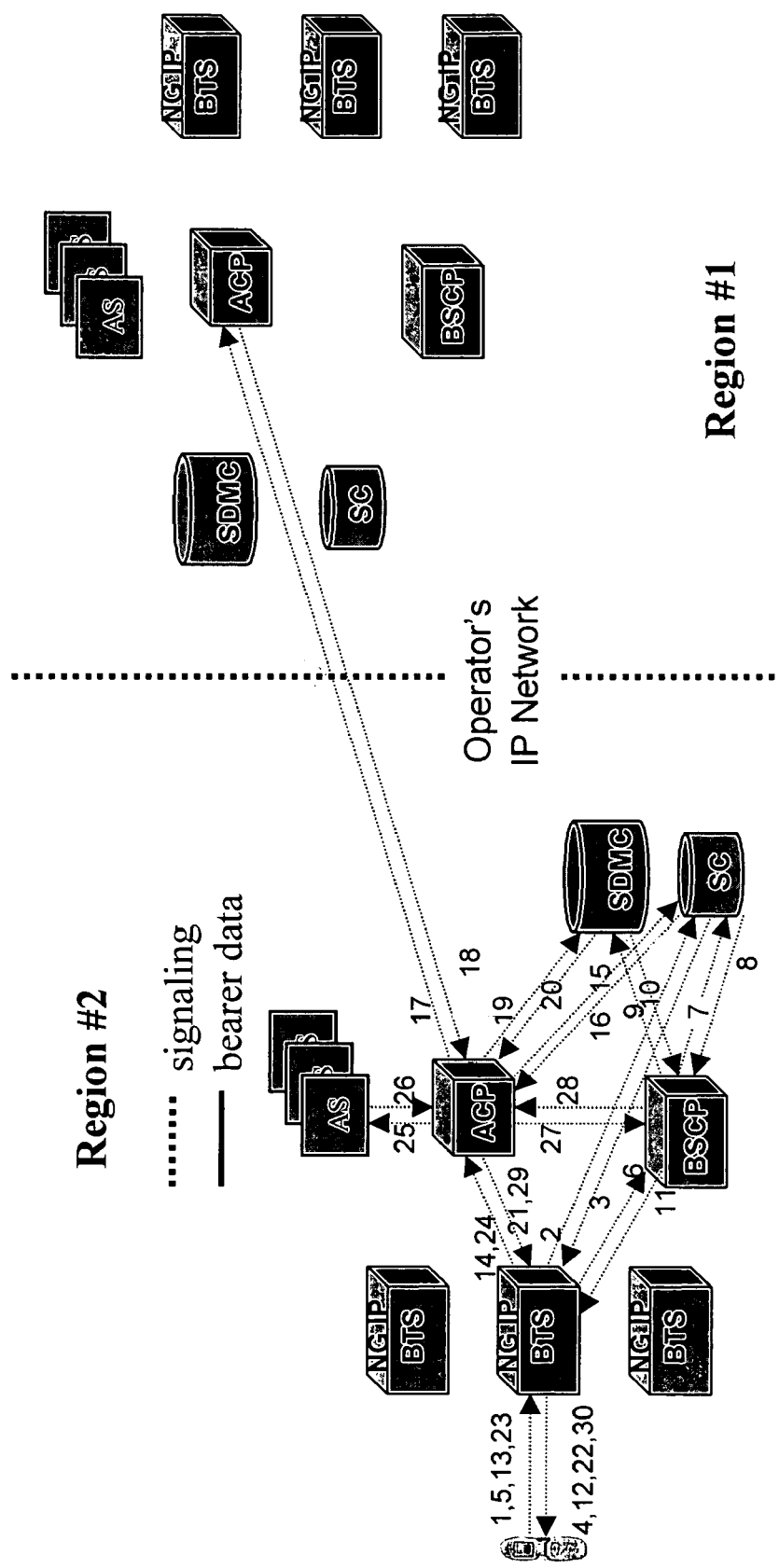
FIG. 6: Subscriber Registration in Visited Network

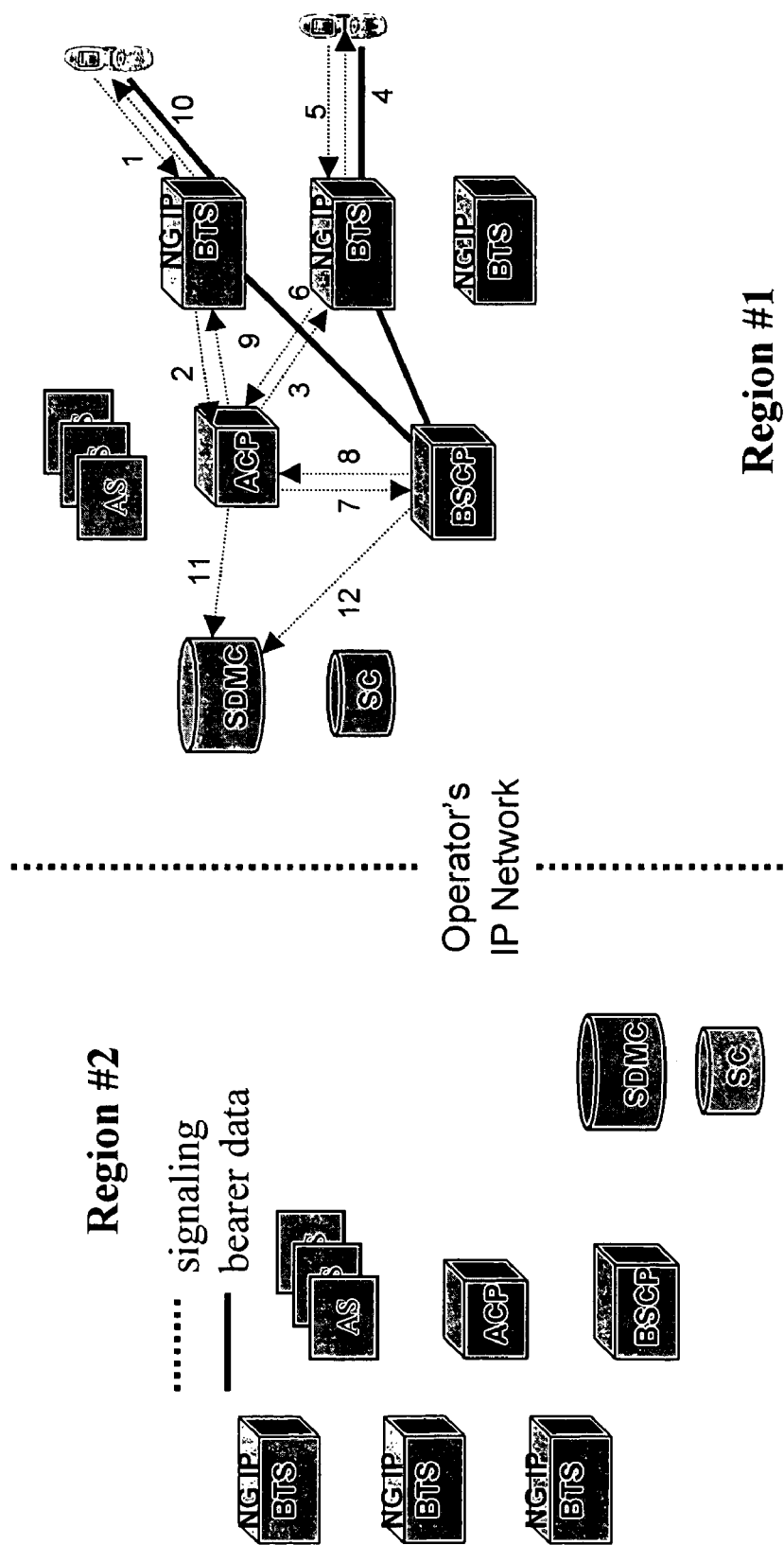
FIG. 7: Subscriber Calling Subscriber in same Home Area

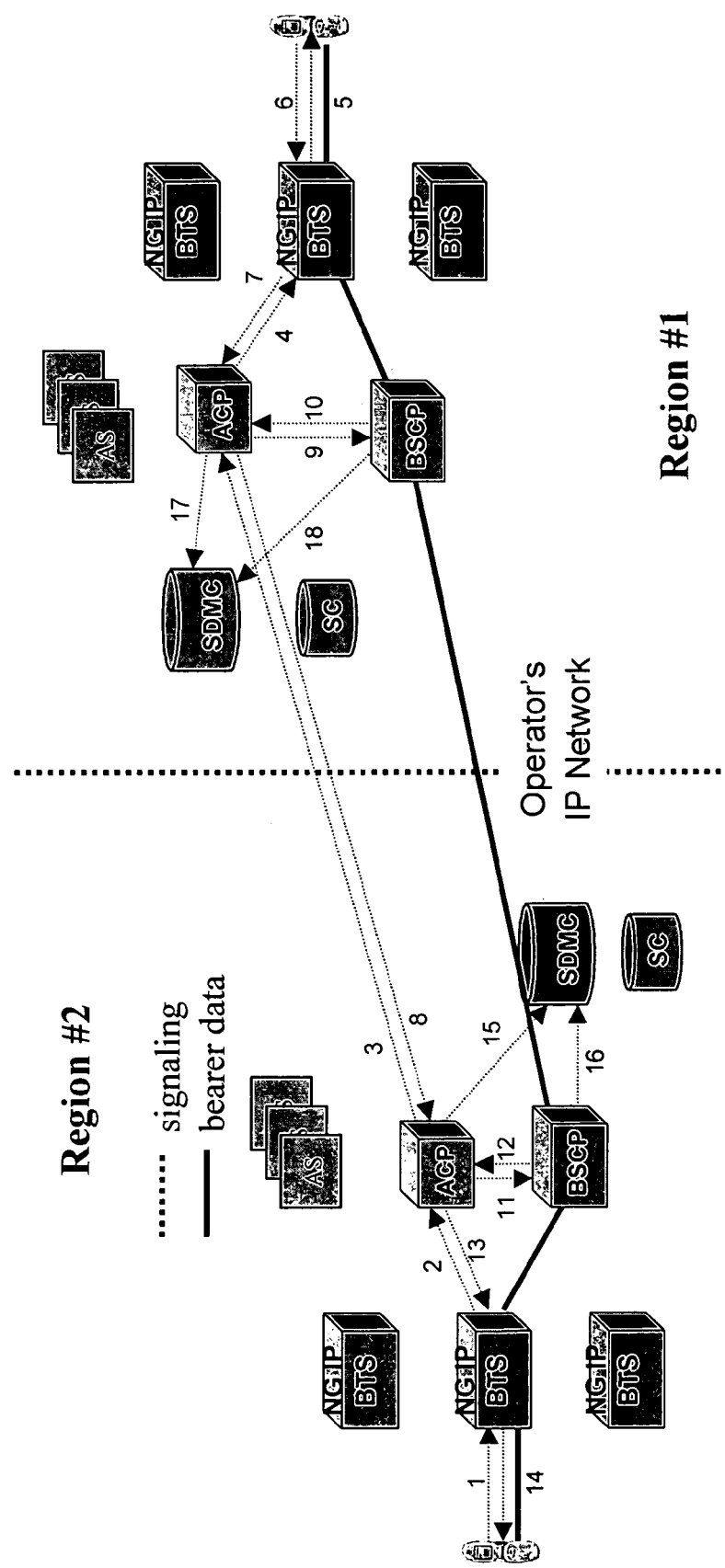
FIG. 8: Subscriber from another Area Calling Subscriber in Home Area

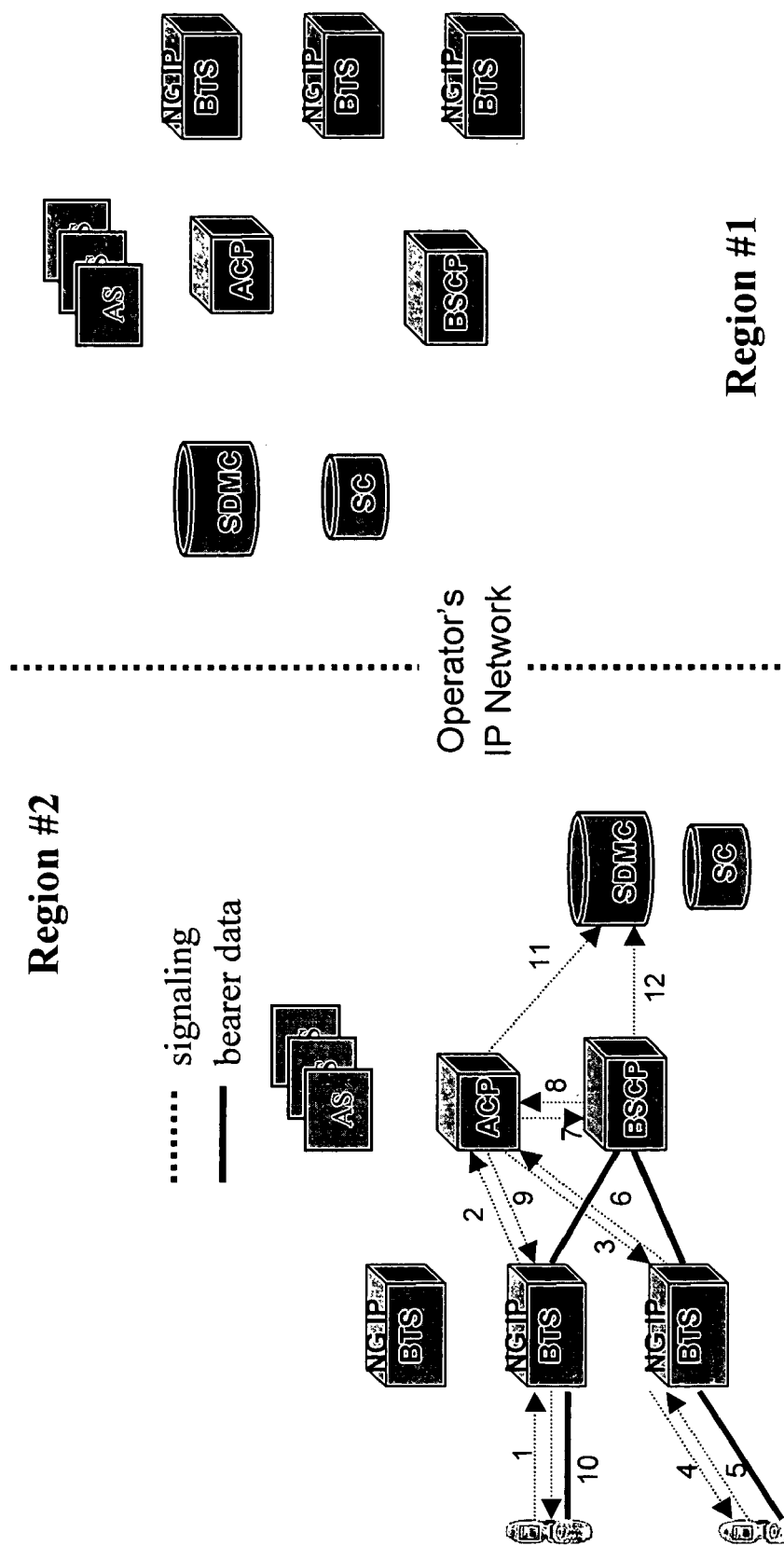
FIG. 9: Subscriber from another Area calling Subscriber while Roaming

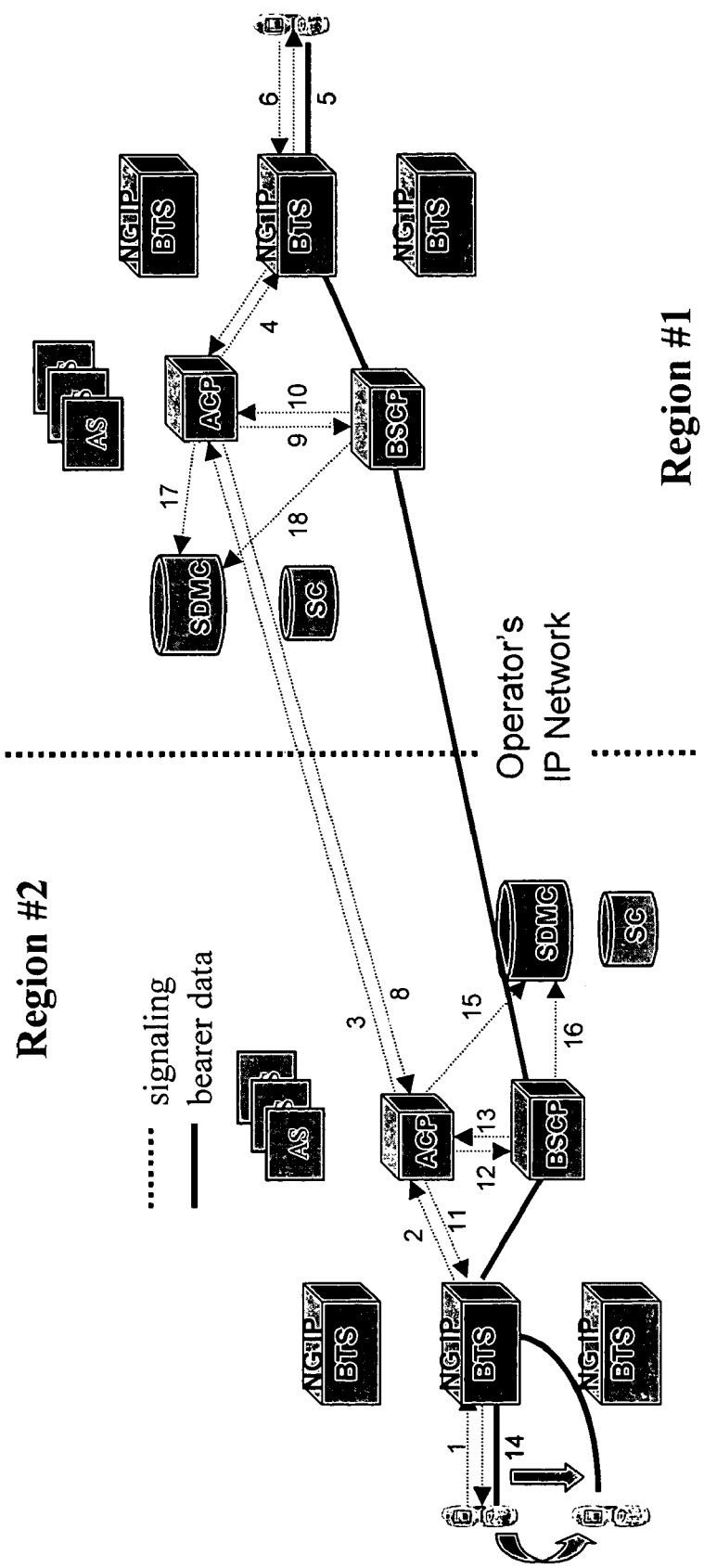
FIG. 10: Handoff of Calling Party

MULTIMEDIA NEXT GENERATION NETWORK ARCHITECTURE FOR IP SERVICES DELIVERY BASED ON NETWORK AND USER POLICY

TECHNICAL FIELD

The disclosure herein relates to a network architecture, components of the network and processes for implementing services through the network, for offering Internet Protocol (IP) based services to users of wireless access terminal (AT) devices in a manner intended to meet various needs of the network operator/service provider.

BACKGROUND

In recent years, mobile wireless communications have become increasingly popular. Initial implementations of mobile wireless communications, for example in the form of cellular telephone networks, supported circuit switched voice communication services. Today wireless carriers also offer packet data communication services to their mobile customers. Today's cellular network architecture is evolving from a circuit-switched, voice-centric architecture towards an IP-based architecture supporting voice, video, and data services. Several new technologies have evolved to support the future architecture.

Networks offering circuit switched voice communication services utilize mobile telephone switching equipment specially adapted to handle communications through base stations for over-the-air communications with mobile telephones. The mobile switching center (MSC), for example, provides circuit-switched links to the public switched telephone network (PSTN) and provides circuit switching of ongoing calls between base stations in support of handoff between base stations. For service control, a public mobile wireless network includes a Home Location Register (HLR), which stores data regarding the valid station's identification, the assigned telephone number, subscription service options terminal capabilities, etc. for each mobile station homed to the network. The home network uses the service information from the HLR to provide the subscribed services to each user's mobile station while the station is operating in the service area of the home network. To facilitate roaming and attendant registration for voice services, each network also implements a Visitor Location Register (VLR). A VLR is a location register, which an MSC temporarily uses to store and retrieve information regarding a visiting user's mobile station. The VLR and the HLR interact to validate each roaming mobile station. For a validated station, service information for that station is downloaded from the HLR to the VLR in a visited access network during a successful registration process. The validation process also provides information to the HLR indicating the current location of the station, to allow the home network to route incoming voice calls to the station at its current location.

Packet-based services have been offered via an overlay on such a circuit-switching voice-centric wireless network architecture as well as a data optimized RAN called the Packet Data Subsystem (PDS). In a typical example, a receiving node, such as a packet data serving node (PDSN), handles packet data sessions. In an initial implementation, the MSC provides a link to the PDSN, which serves as the edge of the IP packet domain. Upon receiving a packet data call, the PDSN accesses an authentication, authorization and accounting (AAA) server to obtain call access authorization. The PDSN can operate in two modes: Simple IP and Mobile IP. In Simple IP implementations, the PDSN assigns the IP address. In Mobile IP network implementations, mobile IP (MIP) address service enables routing of packets between PDSNs, to effectively enable roaming between service areas of different PDSNs. At log-in, a home agent (HA) assigns an address to the station, from the home carrier's pool of addresses, for use during the duration of the session. When a mobile station has roamed across a PDSN boundary, the mobile station obtains packet data services via a different PDSN, and the mobile station obtains a "care-of-address" (COA) from a local Foreign Agent (FA) in the visited region. The registration/validation process provides notice of this COA to the station's Home Agent (HA) in its home network. Although other control nodes or routers may perform these Agent functions, often they are implemented in the PDSNs. The COA address allows the PDSN-HA to route incoming packets for the roaming mobile station arriving with the assigned mobile address through the PDSN-FA router and the visited network, and hence, to the roaming mobile station.

As an upgrade or migration from the above architecture, the 3GPP standards body developed a framework for an IP Multimedia Subsystem (IMS) that would be a services overlay on the existing radio access network (RAN) architecture but would provide end-to-end IP transport, in most cases, without circuit switching for voice traffic. 3GPP does not use Mobile IP and does not have PDSN and HA functions, but it provides analogous mechanisms through SGSN and GGSN. The focus of the IMS development was on voice services over IP, and operator inter-working for voice services is extensively addressed. 3GPP was also a framework to quickly adapt solutions from multiple vendors under the same umbrella.

3GPP2 adopted the IMS framework from 3GPP, and in conjunction with the PDS is referred to as the 'Multi-Media Domain' (MMD). Several IMS paradigms are different from the ANSI-41 circuit switched model utilized today for much of the mobile voice traffic and similar in some aspects to the PDS paradigms. For example:

The IMS architecture separates control, bearer and database functions as compared to the ANSI-41 architecture where the control, bearer and database were provided in the same network element (Integrated MSC, VLR, HLR). This separation needs new network design and operational guidelines/principles.

IMS is based on 'home network control' similar to the PDS as opposed to the 'visited network control' paradigm of ANSI-41 for all real-time as well as data services. This may have significant impact on call/session setup times and the bearer latency based on the geographic distances between the home and visited networks.

IMS is based on 'device intelligence' similar to the Internet paradigm as opposed to 'network intelligence' in ANSI-41. This ignores the conditions of the end-to-end network which provides services to millions of subscribers and which will impact user experience.

FIG. 1 shows the functional specification as is currently defined in the 3GPP2 standard documentation. The top part of the diagram shows the functions of IMS and bottom part shows the functions of PDS. Some functions are common to both subsystems.

The different functions as defined in the existing standards are described below, although some of the functions are not defined yet in the standards and interpretation varies in the industry.

There are a number of Call Session Control Functions (CSCFs). The Proxy Call Session Control Function (P-CSCF) enables the session control to be passed to a Serving CSCF. The Serving CSCF (S-CSCF) is in the home network and invokes the service logic. The Interrogating CSCF (I-CSCF) identifies the S-CSCF associated with the subscriber and also identifies the terminating S-CSCF in a visited network. However, the Serving CSCF (S-CSCF) does not handle service interaction issues as is defined today.

The Home Subscriber Server (HSS) is a home AAA entity and associated databases for IMS related services.

A Media Gateway (MGW) provides an interface between a TDM network, for example, of the PSTN, and the IP network. The Media Gateway Controller Function (MGCF) controls the media gateway. The Breakout Gateway Control Function (BGCF) selects which MGW is to be used for a communication to/from the PSTN as well as other mobile networks. The Signaling Gateway (SGW) provides an interface between SS7 and IP-based signaling.

The Media Resource Function Processor (MRFP) provides media resources like announcements, media streaming, conferencing, etc., in association with or in support of multimedia services. The Media Resource Function Controller (MRFC) controls the MRFP.

The Authentication, Authorization, Accounting (AAA), Home Agent (HA) and Foreign Agent (FA) would function essentially as outlined above.

The Access Gateway (AGW) is the PDSN/FA described above.

The Interconnectivity Core Network-Bearer Control Point (ICN-BCP) is an entity through which IP-connectivity Network flows pass. The ICN-BCP is able to control the allocation of IP-connectivity network bearer resources to the AT and receives QoS and bandwidth related requests from IMS services being invoked by the subscriber.

The Policy Decision Function (PDF) defined today is based on user policies for data services. The functionality for IMS related services is not yet standardized and has wide interpretation in the industry for personalization of IMS services on a user basis.

The Position Determining Entity (PDE) manages geographic location determinations for access terminals, particularly for mobile access terminals. The Position Server in turn provides access to determined geographical terminal location information. These are not yet defined in detail in the Standards.

The standard also identifies the following function elements but has not yet clearly defined specific functions:
  The SIP Application Server (SIP AS)
  The Open Services Access Service Capability Server (OSA SCS)
  The Open Services Access Application Server (OSA AS)
  The Services Capability Interaction Manager (SCIM)

Key features of the 3GPP2/MMD architecture, one or more of which may raise concerns of importance to network operators, include the following:
  The call/session is distributed among several execution environment servers without any operator management capabilities that will be required in order to manage the network features like bandwidth and QoS
  Call/session control is in the device, which will not allow the operator to manage user experience during changing conditions of the network while the user is mobile
  The HSS includes subscriber databases and some service related functions
  Access (read/write) of data into the HSS is provided to all internal and external Application Servers—which may not be desirable from an Operator's perspective in order to maintain security
  Absence of Services/feature interaction management capability to add/drop/modify services as deemed appropriate based on user profile and network conditions
  There is no uniform data management of permanent user data, and transient data needed for the current session execution
  The network operator will need to support subscriber to login from multiple devices (phone, PDA, Laptop) simultaneously and to support simultaneous voice and data from each. The filter criteria required to access profile information is not adequately defined in Standards.

Current converged multimedia services delivery platforms based on the IP Multimedia Subsystem (IMS) have several shortcomings. First and foremost, IMS assumes all future services will be based on Session Initiation Protocol (SIP) whereas in reality SIP and non-SIP services like video/music content and games will co-exist. Therefore IMS cannot control non-SIP services and manage run-time interactions between simultaneous SIP and non-SIP services.

A subscriber may have more than one AT device, and the AT devices may take different forms, e.g. mobile handset station, laptop, portable digital assistant, etc. Each subscriber will obtain a variety of different services through the network. The network operator not only manages the network but also offers some of the services that are available through the network. To provide the user experience that customers expect, the network operator needs to track the state of every service and delivery thereof to all of the user's devices. IMS provides SIP call/session control distributed among several execution environment servers and the user device, which limits the Service Provider in managing bandwidth, QoS, and experience of the mobile user. Furthermore, IMS does not address network policy controls, which are important in managing services delivery across millions of users.

Also, in current networks, various security mechanisms (like user security, application security, network security) are not addressed in a comprehensive way. For example, authentication and encryption at access level, network level, and application level has significant impact on user experience. Also network admission control is not addressed.

In current Standards, mobility management is defined at the link (L2) layer, the network/IP (L3) layer and the application layer. The excessive number of network elements for mobility management is not operationally desirable.

The current standards-based architecture assumes AT device intelligence, whereas a network operator providing services through the network needs a greater degree of network intelligence. The current standards-based architecture assumes home network control, whereas the service provider will likely need visited network control for services like Emergency Services. Also, from the network operator's perspective, there are considerable advantages to centralizing as many functions as possible, which is contrary to the paradigm of the current standards-based architecture.

SUMMARY

A Multi-Media Next Generation Network architecture is disclosed herein, which incorporates inventive concepts to address various ones of the above noted problems with IP Multimedia Subsystem (IMS) architecture for the IP converged wireless network. Network policy decisions may be implemented from a single IP packet layer decision point for all services (e.g. SIP and non-SIP). However, policy enforcement may be distributed across various layers and elements of the network.

In an example, a packet switching network provides communications for a first service which utilizes a first application layer (above L3) service control protocol and for a second service which utilizes a second application layer (above L3) service control protocol, for subscribers' access terminals (ATs). The network includes a link layer (L2) network element, which provides two-way transport for packet communication with one or more of the subscribers' ATs. An Advanced Bearer Control Point (ABCP) tracks network layer (L3) delivery of communication for the one or more of subscribers' ATs involved in communications through the link layer network element, and it tracks availability of resources for providing communication through the network. The ABCP determines allocations of the resources to the one or more ATs, for the communications for the first and second services through the network, in accordance with a network policy. The network also includes policy enforcement functions distributed across the network. The distributed policy enforcement functions control the subscribers' packet communications at network layer three (L3) or above, so as to implement the determined resource allocations for the communications for the first and second services for the one or more of the ATs.

In the examples, there is a group of the first type of services, all of which utilize the session initiation protocol (SIP) as a common application layer (above L3) service control protocol. The second service is one of a number of services that utilize one or another different type of application layer (above L3) service control protocol, that is to say one of a number of non-SIP services provided through the network.

Another aspect of the disclosure is a system for providing layer three (L3) control of subscribers' packet communications through a packet switching network for users' access terminals (ATs). Communications through the network support a first service that utilizes a first application layer (above L3) service control protocol and a second service that utilizes a second application layer (above L3) service control protocol. The control system includes an Advanced Bearer Control Point (ABCP), a router and a policy enforcement function. The ABCP tracks network layer (L3) delivery of communication for the ATs through the network as well as the availability of resources for providing communication through the network. The ABCP determines allocations of the resources to the ATs for the communications for the first and second services through the network, in accordance with a network policy. The a policy enforcement function controls the routing so as to implement at least some of the determined resource allocations for communications through the network, for the one or more ATs for the first and second services.

In the examples, the ABCP is an element of a Bearer Services Control Point (BSCP). A router and policy enforcement function may be implemented in the BSCP, in an access gateway or in a Base Transceiver Station (BTS) having packet switching capabilities, such as a next generation Internet Protocol device referred to as a NG IP BTS. In the NG IP BTS, for example, the router comprises a Proxy-Mobility Manager (P-MM) for the routing of subscribers' communication packets to and from a Base Transceiver Station (BTS) serving as a wireless implementation of the access network element. The P-MM acts as a foreign agent in supporting mobility of wireless AT devices. In that example, the system further comprises a Serving-Mobility Manager (S-MM) for routing subscribers' communication packets between the P-MM and a core packet network. The S-MM acts as a home agent in supporting mobility of the wireless AT devices. The S-MM may be implemented in the BSCP.

Other aspects of the disclosure relate to an Application Control Point (ACP) for providing application layer (above L3) control of subscribers' packet communications for a plurality of services through a network that utilize a common application layer (above L3) service control protocol. The ACP includes a Services Capability Interaction Manager (SCIM). The SCIM provides the control of subscribers' packet communications for the plurality of services through the network. The ACP also includes a database, accessible by the SCIM, for transient storage of service profile data for the subscribers. The SCIM uses subscriber profile data from the database in its control of packet communications for the plurality services provided through the network for the subscribers' access terminals (ATs). The ACP provides a single point of services control for all active services utilizing the common application layer (above L3) service control protocol for all subscribers' ATs, responsive to a network policy decision from a policy decision function implemented at the network layer (L3) of the network.

The Multi-Media Next Generation Network architecture disclosed in the detailed examples below provides for a unified method of providing multimedia services in a converged IP network that can manage user experience. The Application Control Point (ACP) provides a single point of services control for all active SIP-based services for all subscribers via state information and services interaction management. The Bearer Services Control Point (BSCP) is a single point of network and user control for policy management, bearer facilities management, mobility management, charging, and security, for SIP-based services and for non-SIP services. A Services Data Management Center (SDMC) provides for a unified subscriber database for all services for all devices, as well as authorization and accounting information, for SIP and non-SIP based services hosted by the network Operator. A Security Center (SC) is the central repository for all security related databases and functions. The disclosed architecture is access agnostic. The common point is the network/IP layer, and the network architecture is valid for any access technology below the IP layer.

Additional objects, advantages and novel features of the examples will be set forth in part in the description which follows, and in part will become apparent to those skilled in the art upon examination of the following and the accompanying drawings or may be learned by implementation or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict concepts by way of example, not by way of limitations. In the figures, like reference numerals refer to the same or similar elements.

FIG. 1 depicts the current 3GPP2 MMD functional architecture

FIG. 2 depicts an expanded functional architecture, as disclosed herein.

FIGS. 3A and 3B are slightly different depictions of the functional clustering of the expanded functional architecture, for an exemplary network implementation.

FIG. 4 is a functional block diagram of the exemplary functional reference architecture, for a network as disclosed herein.

FIG. 5 is a call flow diagram illustrating subscriber registration in the home area.

FIG. 6 is a call flow diagram illustrating subscriber registration in a visited area of the network.

FIG. 7 is a call flow diagram illustrating processing when a subscriber is calling a subscriber in the same home area of the network.

FIG. 8 is a call flow diagram illustrating processing when a subscriber from another area is calling a subscriber in the home area.

FIG. 9 is a call flow diagram illustrating processing when a subscriber from another area is calling a subscriber while roaming.

FIG. 10 is a signal flow diagram illustrating a handoff of a calling party.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Overview

A Multimedia Next Generation Network architecture disclosed herein covers the entire next generation system for a wide range of communication services, including application, signaling and bearer functionalities. Although many of the concepts are applicable to networks using other access technologies, the examples relate to wireless communication networks.

A packet switching network will provide voice, video, and data services over a wireless air link interface, for subscribers' access terminals (ATs). In the examples, the a group of the services utilize a first protocol such as the session initiation protocol (SIP) as the application layer service control protocol. Examples of such services include voice and/or video telephone services and other multimedia services. However, the network also provides communications for a number of other services that do not utilize the first protocol, e.g. non-SIP services, but instead use one or more other application layer service control protocols.

The exemplary network includes a Base Transceiver Station/Radio Network Controller (BTS/RNC) for providing two-way packet communication over the air link interface with one or more of the ATs. In some instances, the network uses packet capable BTS installations that incorporate certain network/IP layer (L3) functions; whereas instances that utilize RNC/BTS units that do not have adequate packet and layer three capability, the network includes an Access Gateway (AGW) for routing subscribers' communication packets to and from the BTS/RNC and for acting as a foreign agent in supporting AT mobility. A Bearer Services Control Point (BSCP) provides network/IP layer (L3) control of subscribers' packet communications, for voice, video, and data services through the network.

In the examples, the BSCP includes a Serving-Mobility Manager (S-MM), an Advanced Bearer Control Point (ABCP), and several network/IP layer functions like security, charging and filtering. The S-MM provides routing for subscribers' communication packets between the AGW and a core packet network or between the NG IP BTS and the core packet network. In the examples, the core packet network is based on IP/MPLS technology. The S-MM also acts as a home agent in supporting AT mobility. In roaming scenarios, a local BSCP will be used for bearer paths. IP network resources are managed through the ABCP (Policy Decision Function and Policy Enforcement Function for BSCP) and the PEF (Policy Enforcement Function) in the AGW or NG IP BTS in accordance with service profile information of respective subscribers, information regarding available resources and network policies for security, filtering, and charging. Network policies may be stored in the ABCP or in a database associated with the ABCP. The bearer functions of the Session Border Controller (SBC), and network security related functions like IPS/IDS/Firewalls are included in the BSCP and the AGW and NG IP BTS.

The network also includes an Application Control Point (ACP) coupled for packet switched communication of signaling information with the BSCP. The ACP provides application layer (above L3) control and profile management of subscribers' packet communications for SIP-based services through the network. The ACP also acts as a home-ACP with respect to SIP-based services for subscribers' ATs homed to a region serviced by the ACP and as a visited-ACP with respect to SIP-based services for subscribers' ATs visiting the region.

In a disclosed example, the ACP includes a Services Capability Interaction Manager (SCIM), for providing the feature interaction management and profile management on per-user basis of subscribers' packet communications for SIP-based services through the network. This example of the ACP also includes a transient database accessible by the SCIM, which stores service profile data for the subscribers, for use by the SCIM in its control of packet communications for SIP-based services provided through the network for the subscribers' ATs.

The exemplary version of the ACP also implements a number of other IMS functions, such as: a Proxy Call Session Control Function (P-CSCF); a Serving Call Session Control Function (S-CSCF); and an Interrogating Call Session Control Function (S-CSCF). The ACP may also include a Breakout Gateway Control Function (BGCF) and an integrated telephony server for consumer and enterprise services. The ACP also includes gateway functions like ANSI-41/ISUP to 3GPP2 SIP, various versions of SIP to 3GPP2 SIP, Broadband VoIP signaling protocols to 3GPP2 SIP, etc. to support interworking with all those domains. The signaling functions of the SBC are implemented in the ACP.

The Multi-Media Next Generation Network architecture disclosed in the detailed examples below provides for a unified method of providing multimedia services in a converged IP network that can manage user experience. The architecture supports both SIP and non-SIP based services and provides unified control, including subscriber and network policy decisions, at network/IP layer (L3) for both types of services. The architecture provides for a unified subscriber database for all services for all devices, as well as unified policy control and unified security control. The Application Control Point (ACP) provides a single point of services control for all active IMS (SIP) services for all subscribers via state information and services interaction management. The Bearer Services Control Point (BSCP) is a single point of network and user control for policy management, bearer facilities management, mobility management, charging, and security, for IMS services (SIP based) and for non-IMS services (not based on SIP).

A Services Data Management Center (SDMC) consists of all subscriber profiles and equipment related information, authorization and accounting information for IMS and non-IMS services hosted by the Operator.

A Security Center (SC) is the central repository for all security related databases and functions.

The disclosed architecture is access agnostic. The common point is the IP layer, and the network architecture is valid for any access technology below the IP layer.

Network Development—from Function to Architecture

Reference now is made in detail to the examples illustrated in the accompanying drawings and discussed below. FIG. 2 illustrates the architecture, expanded and enhanced to address various needs of the network operator.

The functional architecture shown in FIG. 2 is grouped into functions related to services that can be controlled by the IMS (SIP based services) and the non-IMS based services (do not use SIP). Both groups of services will use the network/IP layer functions and the air link. The left part of the diagram shows the functions that are used at multiple layers—air link (layer two or 'L2'), network/IP (layer three or 'L3') and application layer (above L3). These include several functions related to security and others that relate to service control and accounting. The service control and accounting functions include an authorization and accounting server (AA) and a user or subscriber policy server. A subscriber service database (SDB) maintains service profile data for all of the network operator's subscribers. The security functions include a Key Distribution Center (KDC) and an associated security server, for security key storage and distribution. The security server also implements the authentication, encryption and other network, services, and device related security functions.

The standards have defined voice-related functionality very well—all variants of CSCF, MGCF, MGW, SGW, BGCF. The media resources functions are still being defined—announcement servers, voice mail servers, conferencing servers, transcoders, etc. Position related functions are not defined yet. Use of SBC is not clearly defined.

Features interaction management is one of the key network features for a commercial network operator. This function is not defined yet in standards. The operator requires network intelligence, and in the illustrated network the 'services capabilities interaction manager' (SCIM) provides that intelligence for all SIP based services.

Hence, the SCIM in the enhanced architecture has access to a transient database, which it uses to store subscriber service profile for subscribers receiving service through the network at any given time. When a user first invokes a SIP service on the network, the SCIM communicates with the SDB to upload the subscriber's service profile to the database associated with the SCIM. SIP services for the user are controlled at the application layer using that profile. If there is a need to change data in the profile, during service, the change is written to the transient profile in the SCIM database (not directly to the profile in the SDB). If appropriate, e.g. upon termination of a session or specific user request, the version of the subscriber profile in the SCIM database can be used to update the subscriber's master profile record in the SDB. The master profile record for the subscriber/user in the SDB, however, is relatively secure in that it need not be accessible directly to users AT devices or to application servers.

There are several different kinds of subscriber movement activity that require various forms of mobility management. For example, mobility involves movement of the user and the AT device, often while engaged in an ongoing communication session, e.g. a telephone conversation while in a vehicle that is driving along a highway. Such mobility occurs often while the AT still receives services from the operator's own network, albeit through different portions of that network. Support for such roaming involves registration updates and handoff between network elements. Roaming occurs when a user travels to a location in which the AT obtains services via another 'visited' network, which may belong to another Operator. Such activities involve registration updates and signaling communications to enforce subscription service restrictions from the home service provider when the AT receives services through the visited network. Another user activity is nomadicity. At times, a user will use a device in one location (e.g. an office) and then will go to another location (e.g. a conference room) or to another city or to the home network, turn on the device and expect to receive the same services in the new location. Each of these mobility related user activities have different implications for mobility management in the network, and the architecture disclosed herein addresses those mobility issues at the network/IP layer. For example, the BSCP will provide the network interactions in support of mobility and management thereof and to share information with other providers so as to enable enforcement of policies to allow users to obtain the services they have subscribed to, wherever they are. The above description is for supporting user mobility (when the user is moving around) and services mobility (where all relevant services are available to the user no matter where they are moving). The same also supports terminal mobility, which covers scenarios where the user can change devices.

Presence information includes on/off status of each of the subscriber's AT, and availability for services. Location information includes information like Cell ID, Latitude and Longitude of the subscriber's AT device. Presence information and location information are needed for both SIP and non-SIP services. This is represented by Presence and Location servers covering both the network and the application layers in FIG. 2.

If only the network operator offered services through the network, SIP mobility analogous to ANSI-41 macro-mobility would be sufficient. However, there will be third party services that network subscribers will use; and macro-mobility at the network/IP layer will need to be provided to support those services as well, as the subscriber moves across various access technologies. The Serving-Mobility Manager (S-MM) and Proxy-Mobility Manager (P-MM) are terms used to indicate the functions supporting variants of IP layer mobility and analogous to today's HA and FA. These S-MM and P-MM functions are enhanced to support mobility of real-time services through the use of paradigms like 'make-before-break' connections.

A Session Border Controller (SBC) has been used at an IP network interconnection (Peering) point to support VoIP traffic. SBCs are specialized appliances that provide functions to control network access (closing and opening of firewall pinholes for VoIP media) based on SIP signaling messages, to hide Operator network topology, and to perform network address and port translation. These individual network appliances increase signaling and bearer hops impacting call setup times as well as latency of media. In the illustrated architecture, functions of the Session Border Controller (SBC) are split between the network/IP layer and the application layer. The bearer-related functions are implemented in the network/IP layer, and are represented by the function $SBC_B$ in the drawing. The signaling functions of the SBC are implemented in the application layer, and are represented by the function $SBC_S$ in the drawing.

There are additional functions provided at the IP layer like charging and security. The architecture supports charging of SIP and non-SIP services. The goal is to have a finite number of network elements collecting and sending charging records to the Operator Billing Systems. In this architecture, ACP and BSCP are the two entities collecting charging records for SIP services and for all other services respectively. Charging alternatives like charging by services occurrences, by duration, by features, by bandwidth, by te, by content, etc. need to be supported in the architecture. Security functions like network admission control, firewall and reverse firewall, Intrusion prevention and intrusion detection need to be included in the architecture. Functions like throttling and filtering are included as well.

There are two IP connection points or scenarios in the network:

1) Between the Operator IP network and other managed IP networks/public Internet 2) Between various access networks and Operator IP network The BSCP is the first Operator network element in Scenario 1. It is the IP interface to other IP networks for bearer traffic, and is the control point for all download traffic coming into the access network from the core IP network and from outside IP networks. All the IP layer related functions described above need to be applied. The AGW or the NG IP BTS is the first L3 network element in Scenario 2 for uplink traffic. The AGW/NG IP BTS provides the IP interface to the transport layer elements; and the AGW/NG IP BTS needs to enforce all the above IP layer functions to upload traffic. The BSCP controls all resources for both uplink and downlink traffic.

Similarly the goal is to have provisioning done only to finite number of entities in the network unlike today's architecture where there are increasing number of provisioning points based on the services offered by the Operator.

Regulatory requirements like CALEA, etc. will need to be supported. There will be control functions and bearer functions in the network that are included in the architecture to support those requirements. The bearer functions will be integrated in the BSCP and the AGW/NG IP BTS.

The existing CDMA2000® 1xRTT network has an Authentication Center (AuC) to authenticate voice services. The existing 1xEVDO architecture has an AAA database to support data services, and an AN-AAA database to support air link authentication. Inherent CDMA encryption is employed on the air link. No other encryption is employed at other layers of the protocol stack (IP layer or application layer).

The services profile of the subscriber in a 1xRTT network is in the MSC and the HLR. In the 1xEVDO network, the subscriber services profile is stored in the AAA database. Additional databases are used in existing network to support services like Push To Talk, WAP, etc.

The goal is to have a unified database for all services related information, and to have a separate database for all security related information. The security infrastructure will be such that all the regulatory requirements including Home Security requirements can be met. The Key Distribution Center (KDC) stores all the subscriber related keys for authentication and encryption at multiple layers (link layer—L2, network/IP layer—L3, and application layer—above L3). The inter-network element authentication and encryption keys are also stored here. Both the mobile device and the user have to be authenticated since users could be using more than one mobile device. The device is authenticated at link layer and network/IP layer. The user is authenticated at the network/IP layer and additionally may be authenticated at the application layer.

The expanded architecture provides a unified subscriber database for all services for all devices (phones, personal digital assistants (PDAs), laptops, etc.) and unified policy control for all services. A unified security control facilitates multi-layer authentication and encryption of users, as well as for all inter-network element security. The HSS function as previously defined in MMD is now divided into the Subscriber Database which has the unified subscriber profile and the SCIM (services capability interaction manager) that incorporates all the information related to services execution.

The AAA function is now divided as well. The Authentication function is with the other security functions. Authorization and Accounting (AA) functions are now with the subscriber database. There are many other functions in the network/IP layer that are included in the framework like filtering including CALEA support, bandwidth throttling, deep packet inspection, and charging alternatives.

The services database includes all the information that the users have subscribed to. The authorization and accounting information is also in this database.

The transport network (below IP) could utilize an existing wireless network technology, for example, based on base station transceiver systems and radio network controllers using tunneled IP mechanisms. However, for discussion purposes, we will assume that the transport layer utilizes a native IP architecture, as well. Hence, in the example, the transport layer portion of the network includes native IP capable Base Transceiver Station (NG IP BTS) systems, one of which appears in the drawing. As in other wireless networks, the BTS is the part of the radio network that sends and receives RF signals to/from the wireless access terminals (ATs) that the base station currently serves. The BTS connects to and communicates through the antenna systems (not shown). The BTS at a site contains the transmitters and receivers and is responsible for the control, monitoring, and supervision of communications made to and from each AT station within its serving area or "cell," over the wireless air link. In the illustrated network architecture, the transport between the BTS and the higher level routing elements of the network utilize IP, hence, the BTS in this network is an IP capable system.

Clearly the above architecture, with so many functions provided via separate platforms and communicating via distinct logical interfaces, is not manageable or scalable from an operator's perspective. Analysis of placement of the functions in the operator's network allows clustering of functions that are collocated in the same physical location, (i.e., Cell site/Switch site/Regional site/Data Center) which makes the network more scalable and easier to manage and improves interoperability.

Services infrastructure is overlaid on the PDS. PDS consists of the Serving Mobility Manager (S-MM) and the Proxy Mobility Manager (P-MM), which are variants of today's Home Agent (HA) and Foreign Agent (FA) with necessary modifications required to support real-time services. The control functions of the bearer work in conjunction with the control functions of the application layer.

FIGS. 3A and 3B show functional clustering of the elements of the expanded architecture, based on the analysis of where each function will be placed in the service provider's network. The functions located in the Cell sites, Switch sites, Regional sites or Data Centers of the operator's network are clustered. FIG. 3A depicts an arrangement for utilizing an existing radio access network architecture with layer two (L2) functionality, in which case additional layer three (L3) control functions are clusters in an access gateway. FIG. 3A depicts an arrangement in which the radio access network utilizes IP enhanced equipment such that its control functions extend into both layers L2 and L3.

The examples represent a packet switching network that provides voice, video, multimedia and data services over a wireless air link interface, for subscribers' access terminals (ATs), using packet switched transport, typically using IP packets and associated protocols. The network includes one or more wireless network segments referred to as radio access networks (RANs). A RAN provides wireless communication with users' ATs, in this case by providing layer one and layer two transport of IP packets over the air link to/from the ATs operating in areas that the particular RAN services. The IP packet layer (L3) provides a common interface between the higher layer elements and the layer one and layer two elements of the RAN. In such a network architecture, the RAN includes a Base Transceiver Station (BTS) for providing two-way packet communication over the air link interface with one or more of the ATs, a radio network controller RNC for control of one or more of the BTS units, and at layer three a Proxy-Mobility Manager (P-MM) for routing subscribers' communication packets to and from the BTS and for acting as a foreign agent in supporting AT mobility.

In the arrangement of FIG. 3A, the RNC and BTS are existing layer two wireless network elements. The P-MM and several other layer three functions are clustered into an access gateway AGW. Hence, in that enhanced functional architecture, the layer three functions of the network include an access gateway (AGW), which is the first layer three component in the network that interfaces the traditional RAN (RNC/BTS) type functionality. The AGW, for example, includes the P-MM for mobility and other IP functions like charging, security, and filtering. These functions move to the NG IP BTS in a network implementation with NG IP BTS type base station equipment (FIG. 3B). The IP type BTS is the same as in the expanded functional architecture discussed above relative to FIG. 2.

To provide the user experience that customers expect, the network operator needs to track the state of every service and delivery thereof to all of the user's devices which is done by ABCP. Based on the user and network policies, prioritized services can be provided.

A number of control functions, which apply to IMS service and to non-IMS services are clustered in the network/IP layer (L3 layer) node now referred to as the Bearer Services Control Point (BSCP). In the example, these functions include policy, filtering, charging and security functions. The BSCP also implements the S-MM agent functionality to support mobile IP address and routing capabilities. Of note; the BSCP also provides the advanced bearer control point (ABCP) functionality, to manage IP resources in accordance with appropriate network and subscriber services policies.

Operations through the RAN may be controlled by a radio network controller (RNC) not shown. In a full implementation with an IP routing capability at the BTS, however, resource allocations made by the BSCP would be enforced by appropriate packet scheduling, for example, by a data optimized module (DOM) associated with the routing function of the BTS.

IMS services that rely on session initiation protocol (SIP) are controlled through an applications layer node (above L3) referred to as the Application Control Point (ACP). The ACP aggregates a number of application layer control functions. The Proxy Call Session Control Function (P-CSCF) enables the session control to be passed to the Serving CSCF. The Serving CSCF (S-CSCF) for the home network invokes the service logic. The Interrogating CSCF (I-CSCF) identifies the S-CSCF associated with the subscriber and also identifies the terminating S-CSCF. The Breakout Gateway Control Function (BGCF) selects which MGW is to be used for interworking with the PSTN. Voice is considered a basic service with stringent performance requirements. Hence telephony applications can be integrated into the ACP.

The ACP also includes a Services Capability Interaction Manager (SCIM) functionality. This function has not yet been defined in the standards work. In the network architecture disclosed here, the SCIM is defined as the intelligent function that controls all SIP based services of the IMS. The SCIM has the state information of all active SIP services of all subscribers. The ACP/SCIM work in conjunction with the BSCP to enforce user and network level policies. The SCIM includes a transient working database of subscriber profile information. Subscriber profile data is uploaded to the SCIM database from a subscriber database (SDB) described later, for use and/or manipulation while services are provided from the IMS layer for the subscriber access terminal (AT). The ACP also includes charging functionality for SIP-based services.

At the application layer, several functions are clustered to form a PSTN gateway. The Media Gateway Controller Function (MGCF) controls the Media Gateway (MGW), which provides the actual interface between TDM communications of the PSTN network/other legacy wireless networks and wireless service provider/operator's IP network domains. The PSTN gateway also includes a Signaling Gateway (SGW), which provides an interface between SS7 protocol links in the PSTN and the IP-based signaling utilized in the wireless service provider/operator's network.

FIGS. 3A and 3B also show the MRFC and MRFP functions clustered together at the application layer to form a media server. Often, there will be a number of such servers offering or supporting various services provided by the operator of the network. The Media Resource Function Processor (MRFP) provides media resources like announcements, media streaming, conferencing, transcoding, etc.; and the Media Resource Function Controller (MRFC) controls the MRFP.

As shown to the left in FIGS. 3A and 3B, the functions that are used at multiple layers—air link (layer 'L2'), network/IP (layer three or 'L3') and application layer, also are clustered. The subscriber service database (SDB), the authorization and accounting (AA) server and the user policy server together form a data center referred to as the Services Data Management Center (SDMC). The Key Distribution Center (KDC) and associated security server form a Security Center (SC).

FIG. 4 depicts the Functional Reference Architecture, essentially in the form of a diagram of a network incorporating the routing and management elements under discussion here, for implementing application layer service control for IMS services, network/IP layer bearer control across applications and associated security and subscriber service management functions that apply to all layers.

The ACP and BSCP are at the core of the new system architecture. The ACP provides the call/session processing functions and coordinates cellular subscriber sessions/calls for voice communications and other SIP based services of IMS. As noted above the ACP provides session control and management, data management for service execution, interworking with other MMD/IMS, enterprise and legacy networks, for example, by implementing the P-CSCF, S-CSCF, BGCF, enhanced SCIM, signaling functions of SBC and I-CSCF functions. The ACP in the example also includes a Telephony Server.

The ACP holds the state information for all active SIP services on the subscriber's various access terminals. The ACP also executes the basic voice call processing.

The ACP is the signaling interconnection point to legacy telephony networks, enterprise networks, and other multimedia networks. The ACP is responsible for all SIP services charging. During sessions, the profiles of services being executed are brought into the ACP from the SDMC, specifically from the SDB database into the database associated with the SCIM.

The information required by the Application Servers for services execution is obtained from the ACP. The ACP manages the feature interaction of SIP services being executed on the network, while the BSCP keeps track of non-SIP Operator-hosted as well as non-hosted partner and non-partner services. The BSCP works in conjunction with ACP for SIP based services control. The Bearer Services Control Point (BSCP) includes resource management and mobility management functions, charging functions, filtering and security functions, shown as the ABCP, Security, Filtering, Charging, S-MM functions in FIG. 3. The ACP and the BSCP together provide network control at the application and bearer level.

The ICN-BCP function as defined in the Standards has been enhanced in this architecture to include user and network policy functions for SIP and non-SIP services. The policy functions include decision and enforcement functions. There is only one policy decision function in the network. The BSCP works in conjunction with ACP/SCIM for making the user policy decision on SIP services. The BSCP also works with the AGW/PEF and the BTS or with the PEF function in the NG IP BTS for making and enforcing end-to-end policy decisions. The policy decision function may or may not be integrated with the BSCP. The ACP is the policy enforcement point for SIP services. The BSCP is the policy enforcement point for non-SIP services. The AGW and NG IP BTS are policy enforcement points for the IP layer features as indicated by the PEF block, as shown respectively in FIGS. 3A and 3B.

Policy decision and enforcement is done at two levels—network level and user level. The SDMC is responsible for user authorization. The BSCP has the repository of bandwidth available in the access and Core networks. The BSCP could work in conjunction with NG IP BTS or RNC/BTS for policy decision and enforcement on the access network. The end-to-end bandwidth management is done by the BSCP. For example, the BSCP makes the appropriate policy based decision as to what resources to allocate, and the access network elements enforce that policy be providing the allocated resources to the user's AT device.

The BSCP is also responsible for bearer facilities management, mobility management, non-SIP services charging, access security, IP services security, and network security. It provides interfaces for bearer connectivity to legacy networks, the core IP network, other multimedia domains, other IP networks, the Internet, and Enterprise networks.

IP layer mobility management is done at the BSCP, through the S-MM functionality. The (S-MM) provides packet switched type routing of subscribers' communication packets between the P-MM and other networks/elements. The S-MM also acts as a home agent in support of AT mobility. The home agent functionality makes the BSCP the network anchor point for the AT's IP mobility, for example because the S-MM allocates the IP address to each subscriber access terminal (AT).

The ACP can be implemented on a general purpose computer platform, such as a server or host computer, with appropriate IP packet communication capabilities. The platform is programmed to implement the functions outlined above. In the illustrated configuration, the BSCP has a routing function, e.g. associated with the S-MM. Hence, the BSCP typically will be a router with appropriate control/processing capabilities. The control may be implemented as hardware in the router or as programming for a computer or other processor in or associated with the BSCP router. Similarly, in the illustrated configuration, the AGW has a routing function, e.g. associated with the P-MM. Hence, the AGW typically will be a router with appropriate control/processing capabilities, which may be implemented as hardware in the router or as programming for a computer or other processor in or associated with the AGW router.

The SDMC is the central repository of all subscriber information (all services that the user has subscribed to, for all subscribers). It also maintains the equipment identity register for all subscribers. This assists in blocking illegally acquired subscriber equipment from accessing network services as well as supporting push services. The SDMC also supports authorization and accounting functions. Charging records from the ACP and BSCP are stored in the SDMC for forwarding to the Service Provider billing systems. As discussed above relative to FIGS. 3A and 3B, the SDMC routing, accounting and user policy functions are implemented by the SDB database, the AA Server and the Policy Server. The network policy database maybe integrated with the BSCP or be a standalone database.

User policies control delivery of services to the user, based on user related criteria. The policy server in the SDMC provides user policy related control information. For example, the policies may control interaction between the user's different services (e.g. should an incoming voice call over ride an ongoing video service or just produce a notice display overlaid on the video screen). The policy server in the SDMC provides the user policy information to the ACP, for its use in controlling the user's SIP based services through the network and to the BSCP for all the other services.

The SC formed by the key distribution center (KDC) and the security server provides key distribution, authentication and all other network related security functions. The Key Distribution Center is the repository for all security related authentication and encryption keys for user, application as well as inter-network element security. Additional repositories to may be used to store network related security information.

Device and user authentication has been implemented at multiple layers of the network. The L2 layer has authenticated the device at registration. In mobile wireless networks, an IP address is assigned after successful IP layer (L3) device authentication. The user is authenticated at the IP layer so that all the non-SIP services can be provided. These applications may or may not need independent application layer authentication. The SC will provide necessary authentication functions in support of all of these various layers of authentication. The network may also share application layer authentication with a partner organization or the partner can do their own application layer authentication.

Encryption also has been specified at multiple layers in the standards. Each layer of encryption, however, reduces data throughput, which can significantly impact service over the air link. There are a significant number of keys that need to be managed for encryption, and this problem is magnified if data is encrypted at multiple layers. The KDC is a repository for all the encryption keys as well. In many cases, service provides need not provide encryption at other layers if the network is providing sufficiently secure encryption which is decided at the time of service delivery. The KDC also provides central management of the keys for all encryption and decoding.

The security server can implement network security policies. The security policies, for example, may enforce a requirement that each AT implement security software to protect the network, such as to prevent the introduction of harmful content. The security server checks compliance with the network operator's security policies at or after authentication time.

The Security Center may interface to computers and/or terminal equipment (not shown) for network operations personnel in a security operations center, similar to network operations center. Such an arrangement would enable network operations personnel to monitor security of the network and to make revisions to the security functions, in a unified manner across the entire network.

The clustering illustrates the benefits to an operator by reducing the number of open interfaces required in the entire system such that interoperability can be managed in a multi-vendor environment. The signaling protocols are based on SIP, DIAMETER, and MIP.

The bearer is all based on IP. The use of IP as the bearer renders the architecture agnostic with respect to the transport technology used at the lower layers, e.g. 1xRTT, EVDO, WiFi, etc. Although the discussion has focused on radio technologies in the access network for services to wireless AT devices, the architecture also may be used with landline (e.g. wire or fiber) access network technologies compatible with IP bearer transport. Additional protocols will be used for signaling not related to call processing.

The IMS domain also includes SIP based application servers, at least some of which are for SIP based services offered by the network operator. A SIP based application server (SIP AS) is responsive to the SIP protocol and provides service execution environment for the particular application(s) for the service(s) the particular server supports, e.g. push-to-talk (PTT). Servers are also implemented to meet certain regulatory requirements such as E911, CALEA, etc. In the illustrated implementation, Media Servers provide a variety of multi-media functions. Examples of such servers include: Audio/Video Transcoders, Announcement Servers, Voice Mail servers, interactive voice response (IVR), Content, etc. Each such media server comprises a Media Resource Function Processor (MRFP) to provide the appropriate media resources like announcements, media streaming, conferencing, etc. and a Media Resource Function Controller (MRFC) for controlling the MRFP.

The PSTN Gateway represents the interconnection between the cellular network and the PSTN/other legacy wireless networks. As noted earlier, a Media Gateway (MGW) provides interface between the TDM network in the PSTN and the IP networks. A Media Gateway Controller Function (MGCF) controls the MGW gateway. A Signaling Gateway (SGW) provides interface between SS7 and IP-based signaling.

The Access Gateway (AGW) is the IP layer element providing routing to/from and control of a number of the RNC/BTSs at layer two. The P-MM comprises an IP router with appropriate control functions, which may be implemented in hardware or as an associated programmable controller. The P-MM routes subscribers' communication packets between the BSCP the RNC/BTS. The P-MM acts as a foreign agent in support of AT mobility.

Functional Description

The Reference Architecture outlined above encompasses functionality for basic voice services from ANSI-41 circuit-switched voice networks and all the functionality from the Mobile IP based packet networks. The goal is to provide multi-media services on a tightly integrated application and bearer network to ensure the right user experience. It may be helpful to consider the functions of some of the components in somewhat more detail.

1. Application Control Point (ACP):

The ACP provides the basic call/session processing functions and coordinates the establishment of calls/sessions to and from cellular subscribers. The ACP interfaces closely with the BSCP to coordinate end-to-end services management including bearer facilities management, security, etc. The ACP holds the state information for all the services that each subscriber has on several devices simultaneously. The basic voice call processing is executed in the ACP. All the other services are executed in the Application Servers. The ACP holds the state of all the services being executed for each device of each subscriber. This information is necessary in order to decide which services can be placed on lower priority or altogether dropped when bandwidth congestion occurs on various parts of the network (air link, RAN, IP core). Additional functions of the ACP are charging. All SIP application related charging is also done via ACP. Any mid-session changes, multiple applications, multiple media, etc. all cause charging records to be created. The ACP may have integrated presence and location information. During sessions, the profiles of services being executed are brought into the ACP from the SDMC. The information required by Application Servers for services execution is obtained from the ACP.

A key functionality of the ACP is the Feature Interaction Management of network operator SIP services being executed by each user simultaneously on a device as well as of network operator services being executed by multiple users on the network. The BSCP keeps track of non-SIP operator controlled services that users are executing as well as network operator-partner services, and services from third party non-network operator partners. Together, the ACP and the BSCP provide network control at the application level and at the bearer level.

The ACP operates in two modes: as Home-ACP and as Visited-ACP.

The Home-ACP is the 'home' repository (or has access to) of dynamic information like location and presence for subscribers who have subscribed to service in that home area. It also contains a record for each home subscriber that includes location information, subscriber status on each device, subscribed features, and directory numbers. Voice services are provided on the ACP. Supplementary services are managed by the ACP, but could be provided by the individual Application Servers or integrated in the ACP. The Home-ACP has database functionality for the dynamic state information. The permanent database functionality is in the SDMC. The Home-ACP also provides control and processing functions for the voice services; and feature management functions for the rest of the SIP services. An ACP may serve more than one BSCP.

The ACP also functions as a Visited-ACP for roaming subscribers. The Visited-ACP maintains the local database for the dynamic information related to the visiting subscriber. The V-ACP provides control and processing functions for voice services for the visiting subscriber. The V-ACP retains control of the dynamic information functions (like presence updates) for as long as the subscriber is visiting. The H-ACP will still retain control for services that the V-ACP cannot offer like SIP services. The V-ACP contains subscriber location, status, and service information that is derived from the H-ACP and the SDMC.

The ACP also contains network address translation information to assist in the routing of calls to the appropriate network destination. The ACP supports basic calls to and from mobile users.

The ACP is the signaling interconnection point to Legacy cellular (ANSI-41) networks, Enterprise networks, and other multi-media networks.

2. Bearer Services Control Point (BSCP):

The BSCP is directly responsible for IP (SIP and non-SIP) services control, bearer facilities management, mobility management, charging, and security. It provides the interfaces for all bearer connectivity to legacy networks, to other MMD domains, to Enterprise domains, to other IP networks, and to the Internet.

For real-time services, performance constraints may not allow bearer (media) to travel back to the home network. In such cases, a BSCP in the visited network will provide local services.

Ideally, when native IP is deployed end-to-end, the BSCP is in direct contact with one or more Base Stations on one side and with external network on the other side. In arrangements with traditional equipment in the RAN networks, the BSCP is in contact with the AGW on one side and the external network on the other side. The access information is shared between the application layer (ACP) and the bearer layer (BSCP). The additional functions of the BSCP are:

Charging by services occurrences, by duration, by bandwidth, by te, by content, etc.

Filtering functions like throttling, packet inspection

Security functions like Intrusion Prevention, Intrusion Detection, Firewalls

Network and policy decision is primarily done at the BSCP. Policy enforcement is done at various network elements like ACP, AGW, NG IP BTS, etc. The authorization is done at the SDMC. The BSCP stores the state information for all active IP sessions. The BSCP has a repository of the bandwidth available in the RAN and the Core. The BSCP is in sync with the BTS which has the information related to the air link. The end-to-end bandwidth allocation is done by the BSCP and enforcement is done by the network elements (BTS/RNC/AGW in the short term and NG IP BTS in the long term).

The IMS paradigm allows the user, through the AT, to request any (or all) SIP based services on the assumption that the relatively dumb network will provide the services as requested. However, the network may have constraints on its capacity to deliver services to all of its users. A network with wireless links, in particular, will have limitations on the amount of services it can deliver over the air, and those limitations may vary with geography, weather and other local conditions. The policy based control function implemented by the ABCP allows the bearer control function to over ride service requests from the users' AT devices, to adapt the services delivered to the actual capabilities of the network to deliver those customers obtaining service through the network.

Hence, the ABCP has the available bandwidth information from the air link layer, and it has information as to current services/usage/demand for all user devices receiving service through the network. Based on this information, the ABCP allocates IP bearer resources to user devices and their services in accordance with the user and network policy.

Mobility Management is done at the IP layer. The BSCP is the anchor point for IP mobility. The BSCP allocates the IP address to each subscriber. The subscriber will use multiple devices simultaneously—phone, PDA, laptop, etc. The phone will be 'always-on' in order to facilitate paging, call initiation, etc.

The BSCP is the bearer interconnection point to ANSI-41, Enterprise, other MMD networks as well as to other IP networks.

3. Access Gateway (AGW):

The AGW (see e.g. FIGS. 3A and 4) is the network layer (L3) interconnection point to link layer (L2) access network equipment and implements layer three (L3) functions of the type under discussion here. For example, where the radio access network utilizes older RNC and BTS type equipment, the AGW provides the packet layer interface point for connection thereof to the rest of the IP domains. Hence, the Access Gateway (AGW) includes a router and implements the P-MM functionality in support of AT mobility. The AGW also implements a policy enforcement function (PEF), so that the AGW provides resources for AT communications in a manner that complies with the policy based allocations from the ABCP in the BSCP, particularly with respect to upload traffic.

The AGW also supports several other IP layer functions like security for communications through the RNC/BTS type network elements, such as charging and filtering. A number of regulatory services also require support, and certain aspects of one or more of those regulatory functions are supported in the AGW, such as CALEA.

4. Next Generation Internet Protocol Base Transceiver Station (NG IP BTS):

Radio access networks providing packet switching all of the way through the Base Transceiver Stations (BTSS) may be implemented with an enhanced or next generation version of an IP capable BTS referred to as an NG IP BTS (see e.g. FIGS. 3B and 4). Such a unit includes a router and a policy enforcement function (PEF). In such an implementation, the NG IP BTS provides the P-MM functionality in support of AT mobility. The PEF controls the NG IP BTS so that the BTS provides network resources to AT communications in a manner that complies with the policy based allocations from the ABCP in the BSCP, particularly with respect to upload traffic.

The NG IP BTS also supports several other IP layer functions like security for communications, such as charging and filtering. A number of regulatory services also require support, and certain aspects of one or more of those regulatory functions are supported in the NG IP BTS, such as CALEA.

5. Services Data Management Center (SDMC):

The SDMC is the central repository of all subscriber information. This can be deployed in central locations like the Data Centers in a highly available architecture. This can be implemented on a general-purpose database such that the network operator can add fields to the profile without going through an integration project for every service rolled out. The SDMC can be deployed in a replicated (non-partitioned) mode—all instances of SDMC will have information for all subscribers similar to today's AAA database deployment, or can be deployed in a partitioned mode similar to today's HLR deployments. Appropriate synchronization mechanisms will be implemented by the Operator.

The SDMC also supports authorization and accounting functions. All charging records from the ACP and BSCP are stored here to be forwarded to network operator Billing systems. The SDMC also has interfaces to the Provisioning systems.

The SDMC also serves as the equipment identity register (EIR), which is the functional entity that represents the database repository for mobile equipment-related data. An example of such as data is Electronic Serial Numbers (ESN) of mobile equipment along with the features and status of that equipment. Such a database could assist in preventing stolen or fraudulent equipment from being used to access network services as well as in providing push services.

6. Routing Databases:

The supplementary routing databases like ENUM, DNS and DHCP are also located in the Data Center.

7. Security Center (SC):

The SC is the centralized repository of all security related information. Layer two, Layer three, and application layer authentication and encryption keys are all held here in the KDC. All the inter-network element encryption and authentication keys are also held here. DRM keys for network operator hosted content will also be held here. This database is used to support all security functions of network operator.

8. Application Servers (AS):

Application servers are network entities that provide supplementary services. SIP or OSA/Parlay could be used for developing applications. Web services based on SOAP/XML/HTTP will also provided in this group. Presence and Location servers could be standalone servers supporting services from ACP and BSCP or could be integrated with one or the other. Other kinds of application servers could be non-SIP based.

9. Media Servers:

Media servers provide multi-media supplementary services. These are voice-announcement servers, user messaging systems, etc. Media servers also provide transcoding functions for voice between cellular, PSTN, and other broadband domains.

10. Regulatory Servers:

These are servers related to any regulatory functions like CALEA, E911, etc.

11. PSTN Gateway:

The PSTN Gateway represents the interconnection between the cellular network and the PSTN. The PSTN Gateway includes the functionality of the Signaling Gateway, the Media Gateway and the Media Gateway Control Function.

Interfaces

The interfaces between the functional clusters include signaling interfaces and bearer interfaces as shown in FIG. 4.

Exemplary Call Flows

This section provides examples of several basic voice call flows to illustrate network features like authentication, services verification, authorization, automatic roaming, and handoff. Call flows for the following scenarios are provided.

Subscriber is being serviced in a cell associated with an ACP in the home area

Subscriber is being serviced in a cell associated with an ACP in the visited area (visited network control for voice services)

Calling and Called Party in same Home Area

Calling Party and Called Party in different Areas (Called Party in Visited Area)

Subscriber moving between contiguous cells served by the same ACP (home or visited)

The illustrations of the call flows show the network with two regions and regional deployment of equipment. Each region has its own ACP and BSCP, SDMC and SC, and own set of Application Servers for local execution of services. The databases are assumed to be replicated in this example. The call flows show a network architecture implementation with NG IP BTSs.

FIG. 5 illustrates the call for subscriber registration when the AT is operating in the Home Area. Table 1 below lists the steps in the call flow of FIG. 5.

TABLE 1

Steps in Call Flow for Subscriber Registration in Home Area (FIG. 5)

| Step # | Description |
|---|---|
| 1 | Subscriber registers with NG IP BTS at Layer two |
| 2, 3 | NG IP BTS authenticates subscriber at Layer two |
| 4 | IP sends authentication message to subscriber |
| 5, 6 | Subscriber registers with BSCP at Layer three |
| 7, 8 | BSCP authenticates device and subscriber at Layer three |
| 9, 10 | BSCP obtains services profile for subscriber from SDMC |
| 11, 12 | BSCP provides IP address to subscriber |
|  | BSCP provides authorized non-SIP services to subscriber |
| 13, 14 | Subscriber registers with ACP for SIP applications |
| 15, 16 | ACP authenticates subscriber at application layer |
| 17, 18 | ACP obtains SIP services profile for subscriber from SDMC |
| 19, 20 | ACP authorizes subscriber to use SIP services |
| 21, 22, 23, 24, 26, 27 | Subscriber SIP services are executed |
| 25, 26 | Bearer is requested for services as needed |

FIG. 6 is a call flow diagram illustrating an example of Subscriber Registration of an AT that is roaming in the operator's Network. Table 2 below lists the steps in the call flow of FIG. 6.

TABLE 2

Steps in Call Flow for Subscriber Registration in Visited Area (FIG. 6)

| Step # | Description |
|---|---|
| 1 | Subscriber registers with NG IP BTS at Layer two |
| 2, 3 | NG IP BTS authenticates subscriber at Layer two |
| 4 | IP sends authentication message to subscriber |
| 5, 6 | Subscriber registers with BSCP in visited network at Layer three |
| 7, 8 | BSCP authenticates device and subscriber at Layer three |
| 9, 10 | BSCP obtains services profile for subscriber from SDMC |
| 11, 12 | BSCP provides IP address to subscriber |
|  | BSCP provides authorized non-SIP services to subscriber |
| 13, 14 | Subscriber registers with ACP in visited network for applications |
| 15, 16 | ACP authenticates subscriber at application layer |
| 17, 18 | ACP obtains Presence and Location information from Home ACP |
| 19, 20 | ACP obtains SIP services profile for subscriber from SDMC |
| 21, 22 | ACP authorizes subscriber to use SIP services |
| 23, 24, 25, 26, 29, 30 | Subscriber SIP services are executed |
| 27, 28 | Bearer is requested for services as needed |

FIG. 7 is a call flow diagram illustrating an example of a subscriber station calling a subscriber station in the same Home Area. The assumption is that subscriber already is registered in the Home Area. The ACP and BSCP have all the profile information for the subscriber to deliver services. Table 3 below lists the steps in the call flow of FIG. 7.

TABLE 3

Steps in Call Flow for Subscriber Calling Subscriber in same Home Area (FIG. 7)

| Step # | Description |
|---|---|
| 1, 2 | Calling Party dials Called Party number |
| 3, 4 | ACP sends Invite to Called Party |
| 5, 6 | Called Party responds to Invite |
| 7, 8 | ACP requests appropriate bearer resources |
| 9, 10 | ACP Notifies Calling Party |
| 11 | ACP sends accounting records to SDMC |
| 12 | BSCP sends accounting records to SDMC |
|  | Bearer path is set up between Calling and Called Parties |

FIG. 8 is a call flow diagram of an example in which a subscriber from another area calls a subscriber in the Home Area. The assumption is that the subscriber is already registered in the Visited Area. The Visited ACP has all the services profile for the subscriber to deliver services. Table 4 below lists the steps in the call flow of FIG. 8.

TABLE 4

Steps in Call Flow When a Subscriber from another Area Calls a Subscriber in Home Area (FIG. 8)

| Step # | Description |
|---|---|
| 1, 2 | Calling Party dials Called Party number |
| 3, 4, 5 | ACP sends Invite to Called Party |
| 6, 7, 8 | Called Party responds to Invite |
| 9, 10 | Terminating ACP requests appropriate bearer resources |
| 11, 12 | Originating ACP requests appropriate bearer resources |
| 13, 14 | ACP Notifies Calling Party |
| 15 | ACP sends accounting records to SDMC |
| 16 | BSCP sends accounting records to SDMC |
|  | Bearer path is set up between Calling and Called Parties |

FIG. 9 is a call flow diagram of an example of a call or session in which a subscriber from another area calls a subscriber while the called subscriber is roaming. The assumption is that the Called Party is already registered in the Visited Area. The Visited ACP has the required services profile for delivery of services to the Called Party. Table 5 below lists the steps in the call flow of FIG. 9.

TABLE 5

Steps in Call Flow When a Subscriber from another Area calling Subscriber while Roaming (FIG. 9)

| Step # | Description |
|---|---|
| 1, 2 | Calling Party dials Called Party number |
| 3, 4 | ACP sends Invite to Called Party |
| 5, 6 | Called Party responds to Invite |
| 7, 8 | ACP requests appropriate bearer resources |
| 9, 10 | ACP Notifies Calling Party |
| 11 | ACP sends accounting records to SDMC |
| 12 | BSCP sends accounting records to SDMC |
|  | Bearer path is set up between Calling and Called Parties |

FIG. 10 is a signal flow diagram of an example of a handoff of a calling party. The sample call flow to illustrate Handoff is based on the Calling Party talking to the Called Party currently registered in the Home Area. In this example, the Calling Party roams into another Cell site. Soft Handoff is employed to continue the call/session.

Exemplary Services

Those skilled in the art will recognize that the network architecture discussed above may provide a wide range of services that ride on IP type packet switched transport. It may be helpful to briefly consider a few services that a network operator may choose to implement using the MMD framework.

One example of a service likely to be offered by the network operator is Voice over IP (VoIP). Such operator provided VoIP service can include mass market VoIP as well as VoIP via soft phone technologies (on personal computers or the like). Examples include various voice telephone call communication services and associated features. Each VoIP service will involve interaction between the different functional clusters, including the BSCP, the ACP and one or more application servers (ASs). The network operator may also offer video telephony, again in a mass market VoIP and/or a VoIP via soft phone type implementation.

Push to Talk (PTT) is another example of a service that the operator may offer via the IP network architecture. PTT is a service that emulates a simplex communication over a share wireless link, for example, similar to that of walkie-talkies. The PTT in the illustrated network architecture will involve interaction between the different functional clusters, including one or more application servers and the ACP and BSCP, for example for updating a PTT Buddy List via a Website; committing Buddy List; PTT communications via AT mobile phones; etc.

Another popular service that will likely migrate to the new architecture is short message service (SMS). SMS provides relatively real-time text message delivery to/from mobile ATs and other devices.

The new architecture may also support communications between WiFi and Cellular communication domains.

While the foregoing has described what are considered to be the best mode and/or other preferred examples, it is understood that various modifications may be made therein and that the invention or inventions disclosed herein may be implemented in various forms and examples, and that they may be applied in numerous applications, only some of which have been described herein. It is intended by the following claims to claim any and all applications, modifications and variations that fall within the true scope of the present teachings.

Appendix: Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

AA—Authorization, Accounting
    AAA—Authentication, Authorization, Accounting
    ABCP—Advanced Bearer Control Point
    ACP—Application Control Point
    AGW/FA—Access Gateway/Foreign Agent
    AN-AAA—Access Network AAA
    API—Application Program Interface
    AS—Application Server
    AT—Access Terminal
    AuC—Authentication Center
    BCP—Bearer Control Point
    BGCF—Breakout Gateway Control Function
    BREW—Binary Runtime Environment for Wireless
    BSCP—Bearer Services Control Point
    BTS—Base Transceiver Station
    CALEA—Communications Assistance for Law Enforcement Act
    CDMA—Code Division Multiple Access
    COA—Care of Address
    CSCF—Call Session Control Function
    DHCP—Dynamic Host Configuration Protocol
    DNS—Domain Name System
    DOM—Data Optimized Module
    DRM—Digital Rights Management
    EIR—Equipment Identity Register
    ESN—Electronic Serial Numbers
    EVDO—Evolution Data Optimized
    FA—Foreign Agent
    FTP—File Transfer Protocol
    HA—Home Agent
    H-ACP—Home Application Control Point
    HLR—Home Location Register
    HSS—Home Subscriber Server
    HTTP—Hypertext Transfer Protocol ICN-BCP—IP Connectivity Network—Bearer Control Point
IMS—IP Multimedia Subsystem
IP—Internet Protocol
ISUP—Integrated Services digital network—User Part
IVR—Interactive Voice Response
KDC—Key Distribution Center
MGCF—Media Gateway Controller Function
MGW—Media Gateway
MIP—Mobile IP
MMD—Multi-media Domain
MPLS—Multi-Protocol Label Switching
MRFC—Media Resource Function Controller
MRFP—Media Resource Function Processor
MSC—Mobile Switching Center
NG IP BTS—Next Generation IP capable Base TransceiverStation
OSA AS—Open Services Access App Server
OSA SCS—OSA Service Capability Server
P-CSCF—Proxy—Call Session Control Function
PDA—Personal Digital Assistant
PDE—Position Determining Entity
PDF—Policy Decision Function
PDS—Packet Data Subsystem
PDSN—Packet Data Serving Node
PEF—Policy Enforcement Function
P-MM—Proxy-Mobility Manager
PS—Position Server
PSTN—Public Switched Telephone Network
PTT—Push to Talk
QoS—Quality of Service
RAN—Radio Access Network
RNC—Radio Network Controller
SBC—Session Border Controller
SC—Security Center
SCIM—Services Capabilities Interaction Manager
SDB—Subscriber Database
SDMC—Services Data Management Center
SGW—Signaling Gateway
SIP—Session Initiation Protocol
SIP AS—SIP Application Server
S-MM—Serving-Mobility Manager
SMS—Short Message Service
TDM—Time Division Multiplexing
V-ACP—Visited Application Control Point
VLR—Visited Location Register
VoIP—Voice Over Internet Protocol
WAP—Wireless Application Protocol
Wi-Fi—Wireless Fidelity (IEEE 802.11)

What is claimed is:

1. A system for providing a first service which utilizes a first application layer (above Layer 3) service control protocol and a second service which utilizes a second application layer (above Layer 3) service control protocol, for subscribers' access terminals (ATs), the system comprising:
  an application layer comprising:
    a first application server for providing the first service in accord with the first application layer service control protocol,
    a second application server for providing the second service in accord with the second application layer service control protocol, and
    one or more Call Session Control Functions (CSCFs) for providing application layer (above Layer 3) control of subscribers' packet communications for the first service through the system;
  at least one link layer (Layer 2) network element, each link layer (Layer 2) network element for:
    (1) providing two-way transport for packet communication for one or more of the subscribers' ATs for communications with the first application server for the first service in accord with the first application layer service control protocol, and
    (2) providing two-way transport for packet communication for one or more of the subscribers' ATs for communications with the second application server for the second service in accord with the second application layer service control protocol,
  wherein:
    the first application layer service control protocol is session initiation protocol (SIP);
    the second application layer service control protocol comprises one or more non-SIP protocols;
    the first service which utilizes the first application layer (above Layer 3) service control protocol comprises one or more services based on SIP;
    the second service which utilizes the second application layer (above Layer 3) service control protocol comprises one or more non-SIP services; and
    the at least one link layer network element comprises a Base Transceiver Station (BTS) having packet switching capabilities, for providing the two-way transport for packet communication over an air link interface with the one or more of the ATs;
  a network layer (Layer 3) comprising an Advanced Bearer Control Point (ABCP) for tracking network layer (Layer 3) delivery of communication for the subscribers' ATs involved in communications through the at least one link layer network element, for tracking availability of resources for providing communication through the network, and for determining allocations of the resources to the subscribers' ATs for the communications for the first and second services through the network in accordance with a network policy; and
  a plurality of policy enforcement functions distributed across the network for controlling the subscribers' packet communications, so as to implement the determined resource allocations for the communications for the first and second services for the subscribers' ATs,
  wherein:
    the policy enforcement functions include the one or more Call Session Control Functions (CSCFs) in the application layer above network layer three (Layer 3), and
    the BTS of the at least one link layer network element is configured to implement a policy enforcement function by controlling routing of subscribers' communication packets so as to implement resource allocations determined by the ABCP, for the communications with the one or more of the ATs through the BTS.

2. The network of claim 1, wherein the network layer (Layer 3) further comprises:
  an access gateway for routing subscribers' communication packets for the first and second services to and from the at least one link layer network element,
  wherein the access gateway implements a policy enforcement function by controlling the routing of subscribers' communication packets so as to implement resource allocations determined by the ABCP, for the communications for the one or more of the ATs through the at least one link layer network element.

3. The network of claim 2, wherein the access gateway is configured to implement additional functions relating to charging for bearer services through the network and filtering packet communications for services through the network.

4. The network of claim 1, wherein the BTS is configured to implement additional functions relating to charging for bearer services through the network and filtering packet communications for services through the network.

5. The network of claim 1, wherein the network layer (Layer 3) further comprises:
a router for routing subscribers' communication packets for the first and second services between the access gateway and a core packet network;
wherein one of the policy enforcement functions is implemented in association with the router for controlling routing of subscribers' communication packets from the core packet network so as to implement resource allocations determined by the ABCP, for the communications with the one or more of the ATs.

6. The network of claim 5, wherein the ABCP and the router are clustered to form a Bearer Services Control Point (BSCP).

7. The network of claim 6, wherein:
the router is configured to act as a home agent in supporting AT mobility; and
the BSCP is configured to implement additional functions relating to charging for bearer services through the network and filtering packet communications for services through the network.

8. The network of claim 7, wherein the ABCP is configured so that the determining of allocations of the resources to the one or more ATs for the first and second services is additionally based on service profile information of respective subscribers.

9. The network of claim 8, wherein the application layer further comprises:
an Application Control Point (ACP) coupled for packet switched communication of signaling information with the ABCP, the ACP comprising the one or more Call Session Control Functions (CSCFs) for providing the application layer (above Layer 3) control of subscribers' packet communications for the first service through the network;
wherein the ACP is configured to implement one of the policy enforcement functions as part of the application layer control, to implement resource allocations determined by the ABCP for communications of the one or more of the ATs with respect to the first service.

10. The network of claim 9, wherein the ACP further comprises:
a Services Capability Interaction Manager (SCIM), for providing the control of subscribers' packet communications for first service through the network; and
a database accessible by the SCIM for transient storage of service profile data for the subscribers, for use by the SCIM in its control of the packet communications for the first service provided through the network for the subscribers' ATs.

11. The network of claim 10, wherein the one or more Call Session Control Functions (CSCFs) of the ACP include:
a Proxy Call Session Control Function (P-CSCF);
a Serving Call Session Control Function (S-CSCF); and
an Interrogating Call Session Control Function (I-CSCF).

12. The network of claim 11, wherein the ACP further comprises a Breakout Gateway Control Function (BGCF).

13. The network of claim 11, wherein the ACP further comprises a telephony server.

14. The network of claim 9, further comprising a Services Data Management Center (SDMC) coupled for packet switched communication of signaling information with the ABCP, the BSCP and the ACP, for providing:
control information in accordance with service profile information of respective subscribers to the ABCP in the BSCP; and
control information in accordance with service profile information of respective subscribers to the ACP.

15. The network of claim 14, wherein the SDMC comprises:
an Authorization and Accounting (AA) server;
a subscriber policy server; and
a subscriber database storing service profiles for the respective subscribers.

16. The network of claim 1, further comprising:
a Security Center (SC) coupled for packet switched communication of signaling information with the ABCP,
wherein the SC is configured for providing and managing key distribution to the ATs and for authentication of the users through the network.

17. The network of claim 16, wherein:
the SC comprises a Key Distribution Center (KDC); and
a security server coupled for signaling communication with the ACP and the BSCP.

18. A system for providing a first service which utilizes a first application layer (above Layer 3) service control protocol and a second service which utilizes a second application layer (above Layer 3) service control protocol, for subscribers' access terminals (ATs), the system comprising:
an application layer comprising:
a first application server for providing the first service in accord with the first application layer service control protocol,
a second application server for providing the second service in accord with the second application layer service control protocol, and
one or more Call Session Control Functions (CSCFs) for providing application layer (above Layer 3) control of subscribers' packet communications for the first service through the system;
at least one link layer (Layer 2) network element, each link layer (Layer 2) network element for:
(1) providing two-way transport for packet communication for one or more of the subscribers' ATs for communications with the at least one application server for the first service in accord with the first application layer service control protocol, and
(2) providing two-way transport for packet communication for one or more of the subscribers' ATs for communications with the at least one application server for the second service in accord with the second application layer service control protocol,
wherein:
the first application layer service control protocol is session initiation protocol (SIP);
the second application layer service control protocol comprises one or more non-SIP protocols;
the first service which utilizes the first application layer (above Layer 3) service control protocol comprises one or more services based on SIP; and
the second service which utilizes the second application layer (above Layer 3) service control protocol comprises one or more non-SIP services;
a network layer (Layer 3) comprising:
(a) an Advanced Bearer Control Point (ABCP) for tracking network layer (Layer 3) delivery of communication for the subscribers' ATs involved in communications through the at least one link layer network element, for tracking availability of resources for providing communication through the network, and for determining allocations of the resources to the subscribers' ATs for the communications for the first and second services through the network in accordance with a network policy; and (b) an access gateway for routing subscribers' communication packets for the first and second services to and from the at least one link layer network element; and a plurality of policy enforcement functions distributed across the network for controlling the subscribers' packet communications at network layer three (Layer 3) or above, so as to implement the determined resource allocations for the communications for the first and second services for the subscribers' ATs, wherein:

the policy enforcement functions include the one or more Call Session Control Functions (CSCFs) in the application layer above network layer three (Layer 3), and the access gateway implements one of the policy enforcement functions at network layer three (Layer 3) by controlling the routing of subscribers' communication packets so as to implement resource allocations determined by the ABCP, for the communications for the one or more of the ATs through the at least one link layer network element.

* * * * *